US010063837B2

(12) United States Patent
Zoken et al.

(10) Patent No.: US 10,063,837 B2
(45) Date of Patent: *Aug. 28, 2018

(54) SYSTEM AND METHOD FOR ANALYSIS OF SURFACE FEATURES

(71) Applicant: TireAudit.com, Inc., San Rafael, CA (US)

(72) Inventors: Jack Marshall Zoken, San Rafael, CA (US); Alper Yilmaz, Lewis Center, OH (US)

(73) Assignee: TireAudit.com, Inc., San Rafael, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/686,773

(22) Filed: Apr. 14, 2015

(65) Prior Publication Data
US 2016/0029006 A1 Jan. 28, 2016

Related U.S. Application Data

(63) Continuation-in-part of application No. 13/951,423, filed on Jul. 25, 2013, now Pat. No. 9,291,527.
(Continued)

(51) Int. Cl.
H04N 13/00 (2018.01)
G01B 11/24 (2006.01)
(Continued)

(52) U.S. Cl.
CPC ......... *H04N 13/0221* (2013.01); *G01B 11/24* (2013.01); *G01C 11/02* (2013.01);
(Continued)

(58) Field of Classification Search
CPC ...... G01M 17/027; G01B 11/22; G01B 11/24; G01B 11/2416; G01B 11/275;
(Continued)

(56) References Cited

U.S. PATENT DOCUMENTS 5,438,417 A * 8/1995 Busch .................. G01B 11/24
348/128
6,094,215 A * 7/2000 Sundahl ................ G03B 35/02
348/155
(Continued)

FOREIGN PATENT DOCUMENTS

FR 2938330 A1 * 5/2010 .......... G01M 17/027
FR 2976090 A3 * 12/2012 .......... H04N 13/0221
(Continued)

OTHER PUBLICATIONS

Translation of FR 2976090; Gaspard et al; Jul. 2012.*

*Primary Examiner* — John Villecco
(74) *Attorney, Agent, or Firm* — Dunlap Codding, P.C.

(57) ABSTRACT

Disclosed is a system and method for documenting and analyzing a tire tread using a guidance dolly for use in creating a three-dimensional image file of a target object from a plurality of two-dimensional image files including: a first dolly surface adapted to enable placement of the guidance dolly into physical contact with the target object; a second dolly surface generally conforming to the shape of the first dolly surface; and a guide channel for guiding a digital imaging device along a specified path so as to acquire the plurality of two-dimensional image files of the target object.

10 Claims, 24 Drawing Sheets

Related U.S. Application Data

(60) Provisional application No. 61/979,004, filed on Apr. 14, 2014.

(51) Int. Cl.
| | | |
|---|---|---|
| *G01C 11/02* | (2006.01) | |
| *H04N 13/02* | (2006.01) | |
| *G01M 17/02* | (2006.01) | |
| *G01C 11/36* | (2006.01) | |
| *G03B 17/56* | (2006.01) | |

(52) U.S. Cl.
CPC ....... *G01C 2011/36* (2013.01); *G01M 17/027* (2013.01); *G03B 17/561* (2013.01); *G06T 2200/04* (2013.01); *G06T 2207/10012* (2013.01); *G06T 2207/10028* (2013.01); *H04N 2213/001* (2013.01)

(58) Field of Classification Search
CPC ... G01B 11/2755; G01B 11/30; G01B 11/303; G01B 11/306; B60C 25/007; G03B 17/561; H04N 13/0221; H04N 2213/001
USPC ......................................................... 348/128
See application file for complete search history.

(56) References Cited

U.S. PATENT DOCUMENTS

| | | | | |
|---|---|---|---|---|
| 6,789,416 | B1* | 9/2004 | Tracy | G01B 11/22 73/146 |
| 7,177,740 | B1* | 2/2007 | Guangjun | G01C 1/06 356/139.09 |
| 8,037,744 | B2* | 10/2011 | Hanada | G01B 11/16 73/146 |
| 8,600,192 | B2* | 12/2013 | Liu | G06T 7/593 382/154 |
| 8,948,491 | B2* | 2/2015 | Sekiguchi | G01B 11/30 356/600 |
| 9,002,063 | B2* | 4/2015 | Joly | G01M 17/027 382/103 |
| 9,008,368 | B2* | 4/2015 | Joly | G06T 7/0002 382/104 |
| 9,123,112 | B2* | 9/2015 | Vinciguerra | G06K 9/6204 |
| 9,805,697 | B1* | 10/2017 | Dorrance | G09G 5/40 |
| 2005/0057758 | A1* | 3/2005 | Uehara | G01B 11/245 356/601 |
| 2005/0058333 | A1* | 3/2005 | Kaneko | G01B 11/24 382/141 |
| 2007/0295071 | A1* | 12/2007 | Iwase | G01B 11/25 73/146 |
| 2009/0000370 | A1* | 1/2009 | Lionetti | G01B 11/22 73/146 |
| 2009/0272183 | A1* | 11/2009 | Sukegawa | G01B 11/2522 73/146 |
| 2010/0309309 | A1* | 12/2010 | Bing | G01B 11/046 348/128 |
| 2011/0013823 | A1* | 1/2011 | Joly | G01M 17/027 382/141 |
| 2011/0018999 | A1* | 1/2011 | Joly | G03B 15/03 348/148 |
| 2011/0019903 | A1* | 1/2011 | Joly | G06T 7/0028 382/141 |
| 2012/0007956 | A1* | 1/2012 | Joly | G01M 17/027 348/47 |
| 2012/0008148 | A1* | 1/2012 | Pryce | G01B 11/245 356/601 |
| 2013/0002856 | A1* | 1/2013 | Mizutani | G01B 11/24 348/128 |
| 2013/0128029 | A1* | 5/2013 | Leobal | G01M 17/021 348/128 |
| 2013/0129182 | A1* | 5/2013 | Noyel | G06T 7/0004 382/141 |
| 2013/0201326 | A1* | 8/2013 | Tsujii | G01C 11/02 348/135 |
| 2013/0266189 | A1* | 10/2013 | Vinciguerra | G06K 9/6207 382/104 |
| 2013/0266225 | A1* | 10/2013 | Vinciguerra | G06K 9/6204 382/190 |
| 2014/0043472 | A1* | 2/2014 | Takahashi | G01B 11/2522 348/135 |
| 2014/0132740 | A1* | 5/2014 | Clark | G01M 17/02 348/48 |
| 2014/0232852 | A1* | 8/2014 | Nobis | G01B 11/22 348/128 |
| 2014/0307941 | A1* | 10/2014 | Zanella | G06T 5/002 382/141 |
| 2015/0035971 | A1* | 2/2015 | Bogenschuetz | B60C 11/24 348/128 |
| 2015/0330773 | A1* | 11/2015 | Uffenkamp | G01B 11/22 356/631 |
| 2016/0033368 | A1* | 2/2016 | Neau | G01M 17/027 702/34 |
| 2016/0069779 | A1* | 3/2016 | Uffenkamp | G01M 17/027 356/601 |
| 2016/0121671 | A1* | 5/2016 | Neau | G06T 17/00 703/6 |
| 2016/0221404 | A1* | 8/2016 | Lee | B60C 11/246 |
| 2016/0343126 | A1* | 11/2016 | Miller | G06T 7/0006 |
| 2017/0030709 | A1* | 2/2017 | Tanaka | G01B 11/24 |
| 2017/0160079 | A1* | 6/2017 | Takebuchi | G01B 11/2522 |
| 2017/0227942 | A1* | 8/2017 | Thomson | G05B 19/0426 |
| 2017/0254727 | A1* | 9/2017 | Zoken | G01M 17/027 |

FOREIGN PATENT DOCUMENTS

| | | | |
|---|---|---|---|
| JP | 2009115512 A | * | 5/2009 |
| JP | 2009229439 A | * | 10/2009 |

* cited by examiner

SYSTEM AND METHOD FOR ANALYSIS OF SURFACE FEATURES

CROSS REFERENCE TO RELATED APPLICATIONS

The present Application is related to Provisional Patent Application entitled "A Portable Tool for Measuring and Analyzing Tire Tread Surface," filed 14 Apr. 2014 and assigned filing No. 61/979,004, incorporated herein by reference in its entirety.

FIELD OF THE INVENTION

The present invention relates to a system and method for three-dimensionally imaging, documenting, and analyzing surface regions of an object of interest.

BACKGROUND OF THE INVENTION

It has been known in the art for some years that videogrammetry software, such as Photosynth available from Microsoft and 123D Catch available from Autodesk, can be used to generate a three-dimensional mesh from a plurality of images acquired by a camera moving relative to a target object. Conventional videogrammetry practice, conducted from an aerial perspective, or in a far-range setting, may include target objects such as, for example, forests (for ecological analysis), historic sites, parking lot capture, and crowd security analysis. Conventional videogrammetry conducted from a midrange or close range, may include targeting individual plants, statutes, pottery, fossils, utensils, weapons, reverse engineering of vehicles, and face recognition.

Videogrammetry software functions to: (i) match various interest points across the plurality of images, (ii) infer camera exterior orientation, (iii) interpolate the matched interest points to extract more points, and (iv) generate a three-dimensional mesh. However, conventional videogrammetry methods may not produce satisfactory results for certain objects. For example, the videogrammetry process performs best on surfaces that are non-reflective and highly textured.

Moreover, the image capture must follow certain criteria. The surface of the object of interest should be stationary. Lighting is also important. The lighting should be consistent from one acquired image to the next, and should minimize glare or deep shadows. Image overlap is also essential as, ideally, the acquired images should have at least 50% scene overlap from image to image. Finally, the images should capture the object in an orderly fashion by following a predetermined path, for example, such as by encircling the object of interest.

Conventional videogrammetry methods thus are not particularly well-suited for extremely close (i.e., hyperclose) range image capture of objects such as tire treads, although such objects may present highly textured features at hyperclose range and may seem to be well-suited for three-dimensional structure recovery. What is needed is a method and system for ensuring that scene capture criteria are met, and that provide for consistent lighting, image overlap, and object stability.

BRIEF SUMMARY OF THE INVENTION

In one aspect of the present invention, a guidance dolly suitable for use in creating a three-dimensional image file of a target object from a plurality of two-dimensional image files of the target object as obtained by a digital imaging device comprises: a first dolly surface generally conforming to a selected surface region of the target object, the first dolly surface adapted to enable placement of the guidance dolly into physical contact with the selected surface region of the object; a second dolly surface having a shape generally conforming to the shape of the first dolly surface; and a guide channel extending between the first dolly surface and the second dolly surface, the guide channel for guiding the digital imaging device along a specified path so as to enable the digital imaging device to acquire the plurality of two-dimensional image files of the object.

In another aspect of the present invention, a system suitable for use in monitoring observable changes to a selected surface region of a target object, the system comprising: a digital imaging device for acquiring a plurality of two-dimensional image files of the selected surface region; a guidance dolly for placement against the target object when the plurality of two-dimensional image files are being acquired, the guidance dolly having a contact surface generally conforming to the selected surface region of the target object; and a computing device for converting the plurality of two-dimensional image files into a three-dimensional image file representative of the selected surface region.

In still another aspect of the present invention, a method for monitoring physical changes to a selected surface region of a target object comprises: acquiring a first plurality of digital images of the selected surface region using a guidance dolly placed into physical contact with the target object; converting the first plurality of two-dimensional image files into a first three-dimensional file representative of the selected surface region; acquiring a second plurality of digital images of the selected surface region using the guidance dolly; converting the second plurality of two-dimensional image files into a second three-dimensional file representative of the selected surface region; and comparing a first image generated from the first three-dimensional file with a second image generated from the second three-dimensional image file.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

Figure 1:
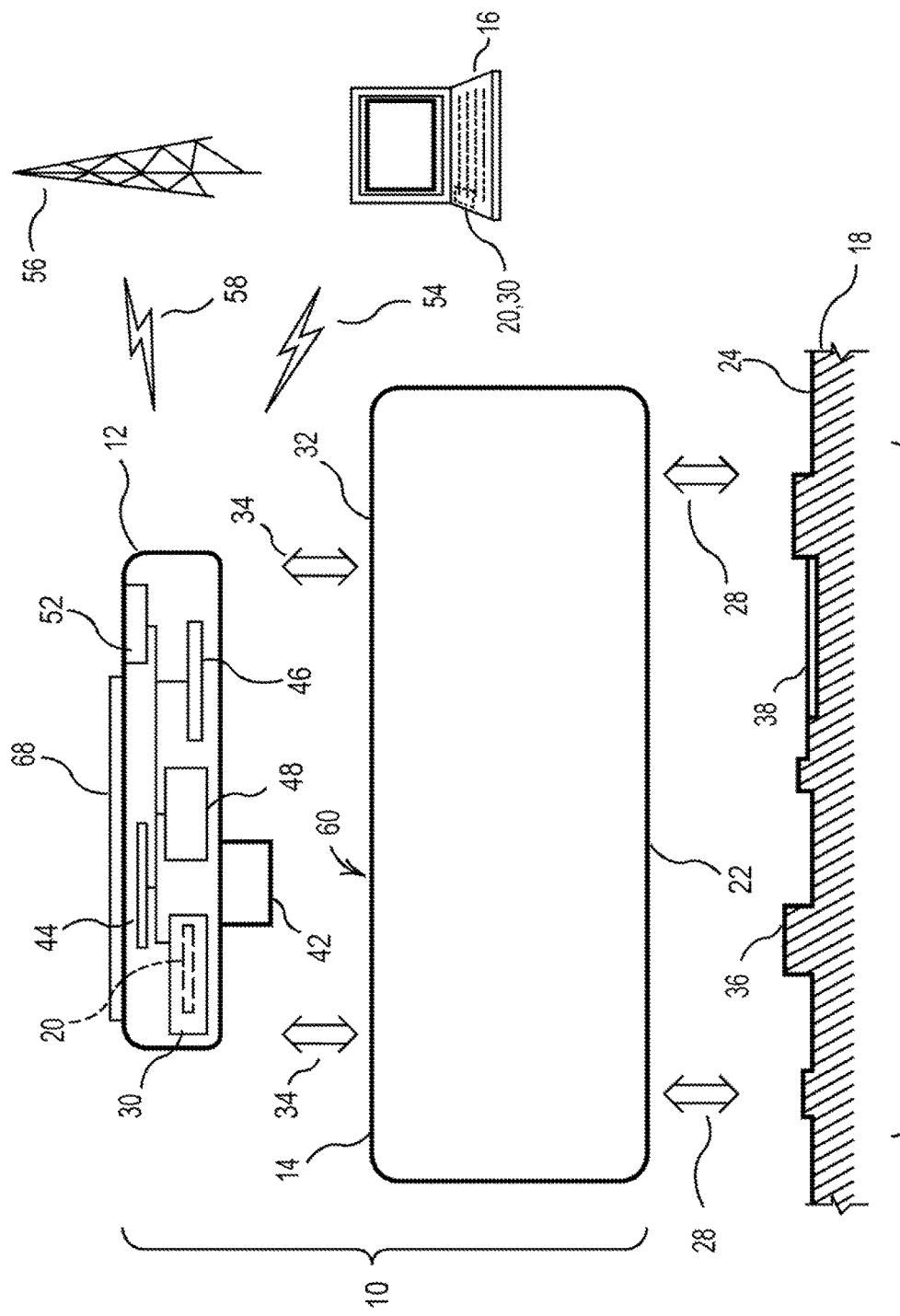
FIG. 1 is a diagrammatical illustration of an imaging, documenting, and analyzing system including a digital imaging device and a guidance dolly, in accordance with the present invention.

The following detailed description is of the best currently contemplated modes of carrying out the invention. The description is not to be taken in a limiting sense, but is made merely for the purpose of illustrating the general principles of the invention.

The present invention relates generally to a system and method for imaging, documenting, and analyzing (IDA) the surface region of a solid object using a series of acquired overlapping digital images obtained by a digital imaging device of an area of interest. The series of digital images are converted to a three-dimensional representation of the object surface region via an IDA software application. A user can analyze the three-dimensional representation so as to determine depth, thickness, wear, or surface changes, for example. Because the imaging process is at the surface of the solid object, that is at a very close range, a guidance dolly is used to physically guide the digital imaging device along a predetermined path proximate the surface region to be imaged.

Planning the path of the digital imaging device and moving along the planned path presents a challenge at hyperclose range, especially the necessity for steadying the digital imaging device at close distances. Otherwise, it is unavoidable that an inadvertent motion will cause significant blurring of the acquired image. Maintaining image overlap may necessitate that digital imaging device motion be less than a fraction of an inch at a time, possibly limiting user access to the digital imaging device viewfinder.

While close range image capture applications may not require controlled lighting, in a hyperclose range application, shallow textures (e.g. tire tread, skin) may require both the balancing of light and the addition of well dispersed, low intensity, diffused light sources. A videogrammetry software application determines three-dimensional structure by triangulating features illuminated by light sources. Accordingly, the light sources should be stationary during the image capture process.

The present invention discloses a specialized guidance dolly to alleviate the above described concerns. The guidance dolly, which serves as an image acquisition platform, provides a systematic way to acquire images from a digital imaging device moving on a predefined trajectory. The digital imaging device trajectory is defined through a moving platform on the guidance dolly. The platform on the guidance dolly translates the digital imaging device along a defined trajectory.

The translation path is specified both to allow adequate photogrammetric angle separation (i.e., parallax) and image matching between successive image captures. The guidance dolly design provides for consistent light source(s), with lighting intensity optimized for the image path. Moreover, the translation process provide exterior digital imaging device orientation during each image acquisition, which improves the three-dimensional structure of the recovered object and simplifies the three-dimensional estimation, thus enabling processing to be performed on mobile platforms, such as smart-phones or tablets.

The present invention utilizes Hyperclose Range Videogrammetry (HRV), that is, photogrammetry for image sequences. The HRV process comprises a novel approach for "capturing" three-dimensional surfaces, and may be performed where the imaging distance from a digital imaging device to the surface of a target object is relatively small, when compared with the imaging distance between the focal plane of the digital imaging device and the surface of the target object. This imaging distance may typically be on the order of a few inches or less. The disclosed method, based on the utilization of videogrammetry, is fast, cost effective, and portable, and can be used to save on maintenance costs. For the tire market alone, consider that about twenty billion is spent on tires each year in the United States and that approximately twenty five percent of a tire's useful life is wasted due to poor maintenance.

The digital imaging device used in the guidance dolly comprises camera electronics for storing and amplifying the observation, an array of pixel sensors containing photo detectors, and a compound or single lens system. The quality of the recovered three-dimensional product is a function of the quality of each of these components and their manufacturing. It is important to generate crisp and focused images for the feature extraction and matching stages of videogrammetry. Use of low quality or plastic lenses, an inexpensive pixel array, and a less than adequate mounting structure for the lens may contribute to a blurring effect that can hinder the subsequent steps of the videogrammetry process.

The use of a digital imaging device to analyze surface parameters thus exploits the wide market penetration of digital cameras and smart phones, and leverages advances in acquisition technology in that most consumer digital cameras may be adapted to the present invention. The disclosed system and method may be adapted for use in accident reconstruction, forensics, archaeology, palentology, architecture, engineering, cinema, mining and situational awareness, for example.

As described above, videogrammetry software may be used to construct a three-dimensional "mesh" from a sequence of digital images acquired from moving the digital imaging device across a region of interest in a target object. Resident software may then be used to match various interest points across successive digital images. This matching process infers digital imaging device orientation relative to the target object, interpolates the interest points to extract additional points, densifies the target surface, and can then generate the desired three-dimensional mesh.

Sufficient lighting is provided to insure that videogrammetry analysis is able to capture adequate interest points across the path and match them across successive digital images. Accordingly, the guidance dolly provides for well-dispersed, low-intensity, diffused illumination. In an exemplary embodiment, the guidance dolly may be configured to block external ambient light which, at the hyperclose range, can oversaturate shallow textures.

By enabling videogrammetry for extremely close range application by use of the guidance dolly, many existing commercial needs can be addressed. In applications such as in tire and vehicle servicing, tire manufacturing, dermatology and dentistry, hyperclose range imaging can provide numerous benefits, such as described below. It can be appreciated that corresponding traditional solutions currently available may require laborious setup and acquisition plans, expensive lasers, and hardware platforms that are far less portable than the solutions provided with the hyperclose range guidance dolly. Moreover the hyperclose range guidance dolly may be adapted for use with many camera and imaging device configurations, and can thus leverage advances in acquisition technology.

There is shown in FIG. 1 a diagrammatical illustration of an exemplary embodiment of an imaging, documenting, and analyzing (IDA) system 10 comprising a digital imaging device 12, a guidance dolly 14, and a computing device 16. The digital imaging device 12 functions in conjunction with the guidance dolly 14, to acquire a plurality of sequential, overlapping, two-dimensional digital images of a specified region of a target object 18.

As shown in the illustration, a dolly contact surface 22 is configured so as to allow placement of the guidance dolly 14 into physical contact with an imaged surface 24 of the target object 18, as indicated by arrows 28. A dolly guidance surface 32 is configured to physically accommodate the digital imaging device 12 during operation of the IDA system 10, in accordance with the present invention. During operation, the digital imaging device 12 may be placed against the dolly guidance surface 32, as indicated by arrows 34, for acquisition of the digital images, as described in greater detail below.

For clarity of illustration, the guidance dolly 14 is here shown as having a generally rectangular configuration. It should be understood that a guidance dolly may be configured in other shapes so as to more closely conform to the geometry of a target surface, as illustrated and described below for various embodiments and applications of the disclosed system and method. In particular, either or both of the dolly contact surface 22 and the dolly guidance surface 32 may comprise a flat surface, a curved surface, or a surface of any other geometric shape that may be used to support and guide the digital imaging device 12 so as to produce the desired quality of digital images.

The guidance dolly 14 thus serves as an acquisition platform, and provides a systematic way to acquire images by moving the digital imaging device 12 along a predefined trajectory. The defined trajectory may include a linear path, a helical path, a spiral path, or an image path specified by an IDA system designer. A controlled light source, described below, provides for illumination intensity optimized for the specified image path. Moreover, the particular configuration of the guidance dolly 14, as adapted for a particular application, provides for optimal orientation of the digital imaging device 12 during image acquisition. This enables the user to adapt a smartphone or a computer tablet, for example, for use in acquiring a three-dimensional structure of a target surface, and simplifies the three-dimensional analysis of surface features.

An IDA software app 20 resident in a software module 30 of the computing device 16 functions to digitally convert, via the use of videogrammetry methods, the plurality of digital images into a three-dimensional data image file representative of an imaged surface region 26 of the target object 18. In particular, the operation of converting to the three-dimensional data image file allows the user to control the digitally generation, display, and manipulation of a selected virtual view of the imaged surface region 26. This virtual view is, accordingly, representative of the corresponding region of the target object 18. In an alternative embodiment, the software module 30 with the IDA software app 20 may be included in the digital imaging device 12 in addition to, or instead of, including the IDA software app 20 and the software module 30 in the computing device 16.

By viewing and manipulating the virtual view of the imaged surface region 26, a user is enabled to inspect and analyze relatively small surface features including, for example, raised surface features 36 and recessed surface features 38. The selected virtual view of the imaged surface region 26 may further enable the user to determine physical dimensions of the features 36, 38. It can be appreciated by one skilled in the art that, without the benefit of the guidance dolly 14, the quality of digital images obtained a relatively small working distance would be inadequate to generate a useable three dimensional image file, and all but impossible to determine the physical dimensions of the features 36, 38.

The digital imaging device 12 may include a lens 42, an image sensor 44, imaging device control circuitry 46, and a digital memory 48. The lens 42 functions to project the field of view onto the image sensor 44, as is well known in the art. A viewing screen 68 may be provided to assist the user in imaging the desired field of view. The image sensor 44 converts the field of view into a two-dimensional digitized image, and the imaging device control circuitry 46 converts each two-dimensional digitized image into a corresponding digital image file, as well-known in the relevant art. The digital memory 48, which may be removable, can be used for storing the acquired and converted digital image files.

As further appreciated by one skilled in the art, most digital imaging devices or cameras that can be used with a guidance dolly, in accordance with the present invention: (i) include camera electronics for storing and amplifying the observation, (ii) include an array of pixel sensors containing photo detectors, and (iii) may include a fixed focal length compound or single lens system. The quality of the three-dimensional information obtained by the user is related to the quality of each of these components and quality of their manufacturing. Preferably, the user is able to acquire crisp and focused images for the feature extraction and matching stages of videogrammetry. The use of a digital imaging device that comprises a low-quality or plastic lens, or has been fabricated by shoddy manufacturing of the pixel array or mounting of the pixel array alongside the lens, may create blurring effect that adversely affects the quality of the three-dimensional features produced for analysis.

In an exemplary embodiment, the digital imaging device 12 may further comprise a wireless communication module 52, such as a Bluetooth module, for communicating with the computing device 16, or with a tablet computer for example, the means of communication represented by a wireless link 54. Alternatively, the wireless communication module 52 may communicate with a cell tower 56, as represented by a cellular link 58. The computing device 16 may be configured to wirelessly receive the acquired two-dimensional image files for subsequent conversion into the three-dimensional data image, via the IDA software app 20 resident in the software module 30 of the computing device 16. In an alternative embodiment, the digital imaging device 12 may be linked to the computing device 16 via an electrical cable (not shown) to enable a direct transfer of the plurality of digital image files into the computing device 16.

In the embodiment shown, the guidance dolly 14 is configured to provide an open guidance channel 60 extending between the dolly guidance surface 32 and the dolly contact surface 22 such that the digital imaging device 12 is able to image the target object 18 from various positions on the guidance surface 32. The guidance channel 60 also allows for the insertion of the lens 42 for imaging devices, in imaging devices where the lens 42 protrudes from the front surface. As the digital imaging device 12 is placed against the dolly guidance surface 32 with the lens 42 positioned adjacent to or inside the guidance channel 60, the guidance dolly 14 functions to maintain the digital imaging device 12 at a desired distance and orientation relative to the surface of the target object 18.

The guidance dolly 14 thus serves as the acquisition platform, and provides a systematic way to acquire images from the digital imaging device 12 when moving along a predefined trajectory. The predefined trajectory enables the user to extract an adequate sample of the surface of the target object 18, and is designed both to allow adequate photogrammetric angle separation (i.e., parallax) and image matching between successive image captures. The guidance dolly 14 provides support at the surface of the target object 18 so as to maximize stability of the digital imaging device 12 relative to the target object 18, while digital images are being acquired.

Stability of the digital imaging device 12 during image acquisition is important for precise three-dimensional structure recovery. The importance is attributed to the initial steps of the videogrammetric process, including the extraction of surface features from each digital image, and the process of finding matching features across successive images. In the case when the digital imaging device 12 moves slightly during image acquisition, the resulting image may be blurred, and the extraction and matching of interest points may be inhibited. The guidance dolly 14 serves to constrain camera motion to a predefined trajectory and thus ensures camera stability.

Figure 2:
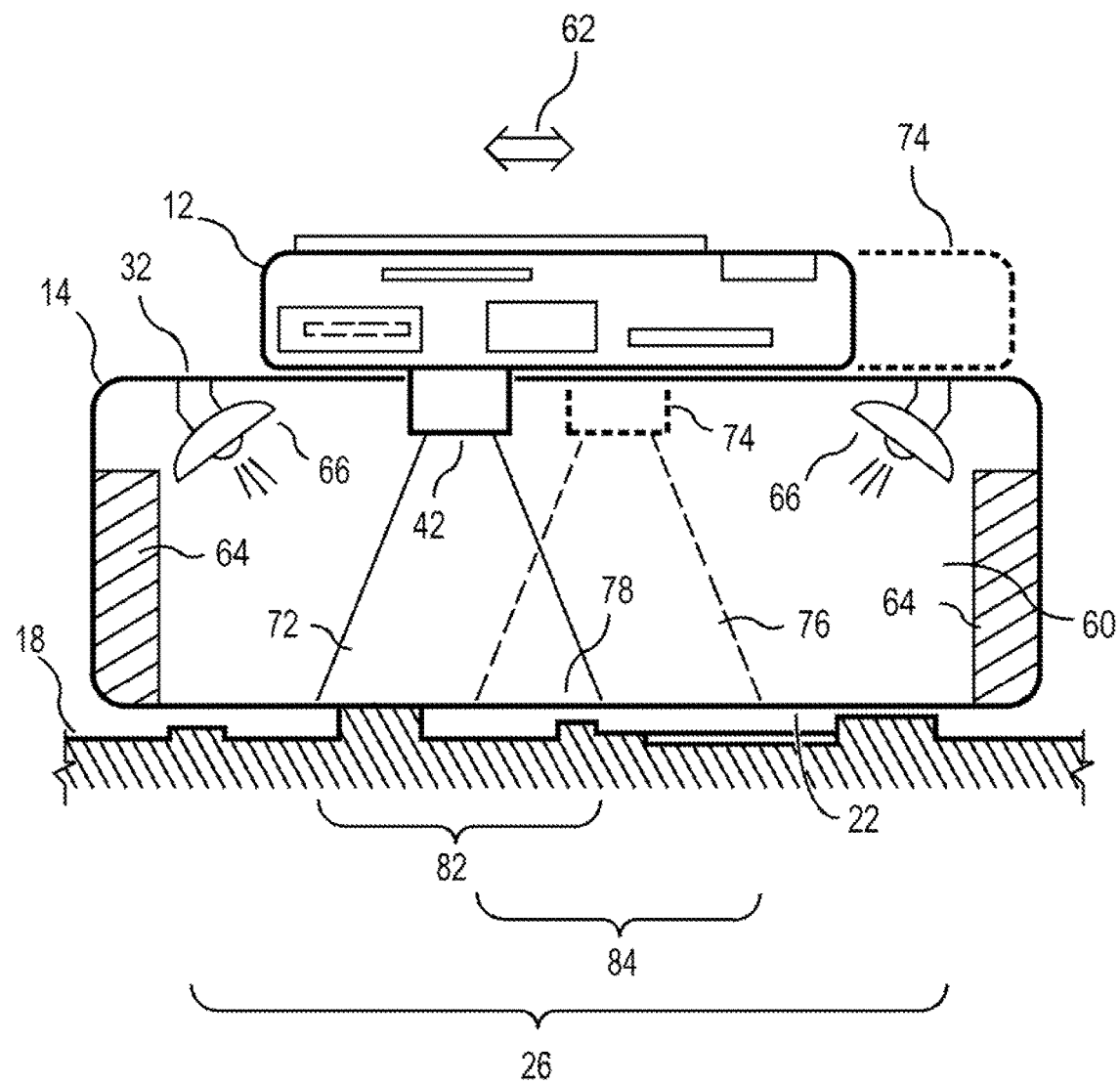
FIG. 2 is a sectional diagrammatical view of the guidance dolly of FIG. 1 showing imaging field of view and overlap of adjacent digital images.

As shown in FIG. 2. the guidance channel 60 is sized and configured to accommodate the digital imaging device 12 such that at least a portion of the target object 18 lies in the field of view 72 of the lens 42 when the digital imaging device 12 is positioned against the guidance surface 32. The guidance channel 60 and the guidance surface 32 thus jointly function to guide the digital imaging device 12 along a predetermined path, as indicated by arrow 62, such that a sequence of selected portions, such as a first selected portion 82, of the target object 18 can be imaged.

For example, by moving the digital imaging device 12 to an adjacent location, represented by the dashed outline 74, a second field of view 76 can be imaged, here indicated as a second selected portion 84. In a preferred embodiment, movement of the digital imaging device 12 is controlled so that there is an overlap 78 between successive digital images obtained. The overlap 78 may range from 10% to 50%, as described in greater detail below. This overlap enables the IDA software app 20 to correlate surface features or a reference point identified in both the first selected portion 82 and the second selected portion 84.

As can be appreciated by one skilled in the art, the support dolly 14 is constructed having a specified distance between the dolly contact surface 22 and the dolly guidance surface 32. The dolly guidance surface 32 is thus selectively offset from the dolly contact surface 22 so as to maintain the image sensor 44 at a controlled distance from the surface of the target object 18 as the digital imaging device 12 is moved along the dolly guidance surface 32. This imaging configuration serves to: (i) maintain the surface of the target object 18 in focus as the digital imaging device 12 is moved along the dolly guidance surface; (ii) provide stability to the digital imaging device 12 such that the digital images obtained are not blurry; and (iii) assure that there is an overlap 78 between adjacent digital images.

The guidance dolly 14 may include one or more light sources 66 to provide the desired illumination for imaging. The light source 66 may comprise a light-emitting diode, a fluorescent bulb, an incandescent bulb, or any other compact light source known in the relevant art. Preferably, the one or more light sources 66 are arranged so as to provide relatively uniform lighting of the imaged surface region 26. A light barrier 64 may also be provided at either or both ends of the guidance channel 60 to block stray ambient light from affecting the illumination projected onto the imaged surface region 26.

The consistency of lighting on the imaged surface region 26 serves to avoid the presence of shadows. Shallow textures, such as found in tire treads or skin surfaces, require the balancing of illumination by using well-dispersed, low intensity, diffused light sources. As three-dimensional structure is derived by the triangulation of features illuminated by the light sources, the light sources should be stationary during the capture process. This may be achieved by the attachment of the light sources 66 directly to the inside surface of the guidance channel 60, as shown.

As can be appreciated by one skilled in the art, consistency of lighting means that the light conditions are controlled by the user during acquisition of the image sequence. The light sources 66 are thus disposed to the side or front of the digital imaging device 12 such that the digital imaging device 12 or the lens 42 does not cast a shadow onto the target object 18. Sufficiency of lighting means that adequate interest points are acquired across the trajectory path, and that the interest points are matched across successive digital images. Accordingly, the well-dispersed, low intensity, diffused light sources are emplaced in the guidance dolly 14 so as to insure the desired consistency and sufficiency of lighting. Optimal positioning of the light barriers 64 serves to block external light and prevents oversaturation of shallow textures.

The IDA software app 20 may reside in either or both of the digital imaging device 12 and the computing device 16, as shown in FIG. 1. As described above, the IDA software app 20 functions to generate a three-dimensional representation of a selected region of the area of interest of the surface of the target object 18. In an exemplary embodiment, the software conversion application may comprise, for example, 123D Catch available from Autodesk or Photosynth available from Microsoft.

Once the user has acquired digital images of acceptable quality, the IDA software app 20 may function to generate the three-dimensional mesh, in accordance with best videogrammetry practice. The three-dimensional mesh may benefit from merging a world coordinate system into the mesh parameters, even if the three-dimensional mesh may be internally consistent. This merging can be accomplished by (i) establishing a reference frame, (ii) measuring a reference distance within the mesh, and (iii) associating the three-dimensional mesh with real-world units.

Figure 3:
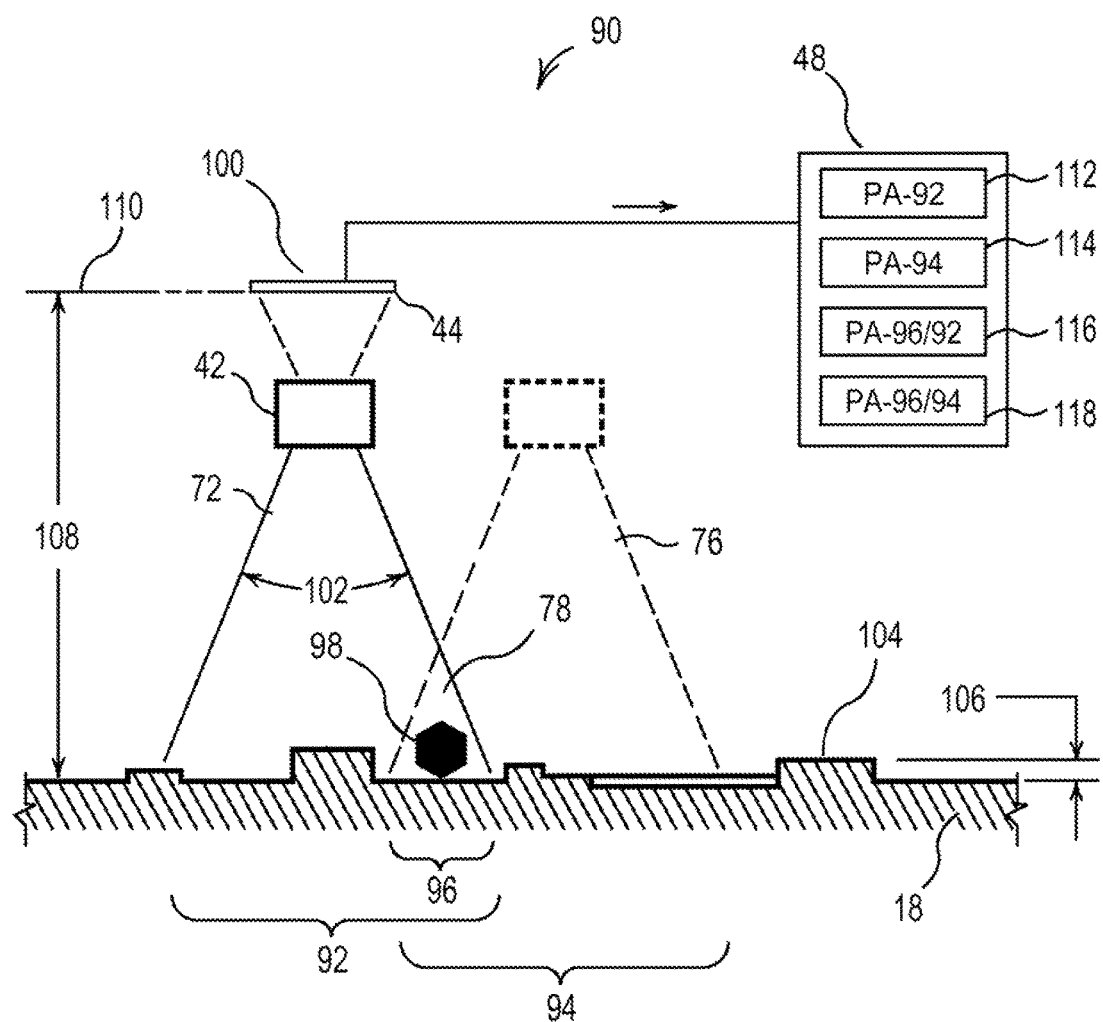
FIG. 3 is a functional diagrammatical view of the guidance dolly of FIG. 1.

There is shown in FIG. 3, a functional diagrammatical illustration 90 of the system of the present invention. The lens 42 operates with a specified angle of view 102, providing the first field of view 72 when the lens is in a first position. In a preferred embodiment, the lens 42 provides for a "normal," rather than a wide angle or long focus, field of view. The lens 42 functions to project a first image 92, comprising a portion of the target object 18, onto the image sensor 44. The image sensor 44 has a specified number of active pixels 100 used to digitize the first image 92, as is known in the art. The focal plane 110 of the image sensor 44 is located at a distance 108 from the target object 18.

After the lens 42 has been moved laterally to a second position so as to acquire the second field of view 76, the lens 42 functions to project a second image 94 onto the image sensor 44. In accordance with the present invention, the distance between the first position and the second position is such that the first field of view 72 overlaps the second field of view 76 by a specified amount. This overlap is exemplified by an overlap image 96, comprising pixels which appear in both the first image 92 and the second image 94.

As the lens 42 is translated along the target object 18 in a predetermined path, a succession of digital images are obtained and stored in the digital memory 48. For example, an image file 112 contains data on a pixel array corresponding to the first image 92. Similarly, an image file 114 contains data on a pixel array corresponding to the second image 94. Another image file 116 comprises data on a pixel array corresponding to the overlap image 96 as contained in the first image 92 pixel array, and yet another image file 118 comprises data on a pixel array corresponding to the overlap image 96 as contained in the second image 94 pixel array.

As discussed above, stability of the digital imaging device 12 during image acquisition is important for precise three-dimensional structure recovery. The importance is attributed to the initial steps of the videogrammetry process including the extraction of interest points from each image, and finding matching features across digital images. In the case when the digital imaging device 12 moves slightly during image acquisition, the image may become blurred, which inhibits extraction and matching interest points. The hyperclose range guidance dolly 14 constrains the motion of the digital imaging device 12 to a predefined trajectory and thus ensures the stability of the digital imaging device 12.

When the captured digital images are adequate, the IDA software app 20 will be able to generate a three-dimensional mesh. The mesh, while internally consistent, still requires that a world coordinate system be established. This can be accomplished by established a reference frame; measuring a reference distance (in the mesh) and associating it with real-world units. Preferably, a reference object 98 is present in the overlap image 96 to more positively enable correlation of the pixels in the overlap image 96 portion as acquired in the first image 92, with the pixels in the overlap image 96 portion as acquired in the second image 94. This correlation further provides geometric correlation between the pixels in the first image 92 with the pixels in the second image 94.

The IDA system 10 functions to ascertain geometric data related to surface features of the target object 18, such as surface feature 104. The thickness or height 106 of the surface feature 104, for example, may be determined by deriving the three-dimensional mesh of the surface of the target object 18 from the succession of digital images obtained and stored in the digital memory 48.

As can be appreciated by one skilled in the art, the accuracy of the three-dimensional shape recovery is a function of the quality of the extracted features and the density of feature matches across images acquired in consecutive time epochs. Both the extraction and the matching performances depend on the clarity of texture in the digital images, including the first image 112, the second image 114, the first overlap image 116, and the second overlap image 118. This requirement for clarity of texture renders lighting as one of the important components of the design of the guidance dolly 14. Depending on the orientation and type of light sources 66, the objects in a scene can appear considerably different in the corresponding digital images. This observation is attributed to the cast shadows the light sources 66 may generate, as well as the uniformity of the light incident on the imaged surface 24. Different surface shapes, however, may require different light sources 66 to produce a relatively uniformly lit imaged surface 24, and yield clear digital images for three-dimensional recovery purposes.

Accordingly, the design of the support dolly 14 incorporates a Smart Lighting Configuration to overcome lighting-related limitations for hyper close range videogrammetry. In particular, the Smart Lighting Configuration allows the user to specify and adjust; (i) the intensity of the incident illumination, (ii) the location of the lighting sources 66, and (iii) the orientation of the lighting sources 66. In a preferred embodiment, the Smart Lighting Configuration comprises two stages: a learning stage and an adjustment stage. The learning stage may be based on prior surface information provided to the support dolly 14.

In one aspect of the disclosed method, a reference frame can be established by exploiting known dimensions on the target object 18. Prior surface information may comprise, for example, three dimensional stock data for a tire surface available from the tire manufacturer, when the surface of interest is a new or worn tire tread. For example, when imaging the tread of a tire, a tire mesh coordinate system can be established using the known measurement of tire section width. For a tire, the tire section width is the widest dimension measured across a latitudinal section of the tire.

Alternatively, prior surface information can be gathered by an initial analysis of a set of images taken using the support dolly 14 under substantially uniform lighting. This approach may utilize an initial pass of the digital imaging device 12 to gather information and establish a baseline or initial data set. Subsequent estimation of the manner in which the Smart Lighting Configuration should be adjusted for 3-D acquisition can be based on either shadow information encoded in the digital images, or the sparse low-quality 3-D acquired during an initial pass of the digital imaging device 12. After the Smart Lighting Configuration has been initially set up, the intensity and orientation of the lights can be adjusted, and the 3D acquisition can be performed.

Alternatively, a reference object or objects of known dimensions can be placed in the field of view on the target object 18. The reference object may be integrated with the guidance dolly 14, for example, and seamlessly included in the field of view. In an exemplary embodiment, represented by the illustration of FIG. 4, a Cartesian axis 112 is shown on an imaged surface region 114, here shown as a portion of the tire tread on a tire 116. The Cartesian axis may be provided in three colors to enable automatic identification by the IDA software app 20. Accordingly, a corresponding reference frame may be automatically established after the processing of the IDA software app 20 has been completed, in accordance with best videogrammetry practice.

Generally speaking, commercial businesses rely on trust. The application of the disclosed system and method are grounded in visual data that facilitates such understanding and trust. Through the IDA system 10, an auto-service customer can confidently purchase new tires, a dermatologist can better measure and assess the growth of a possible tumor, and a dentist can more clearly identify tooth problems. The solutions provided by the IDA system 10 may also be integrated within compliance work-flows, such as, for example, insurance and other statutory regulations. The IDA system 10 may provide for a robust audit trail using a visual addendum underlying an analysis report, the addendum including a three-dimensional surface model and a related sequence of digital images.

As can be inferred from the description above, the IDA system 10 is cost effective to deploy, requiring only the guidance dolly 14, a digital imaging device 12, and videogrammetric functionality provided by the IDA software app 20. It can be appreciated that guidance dollies are relatively inexpensive to manufacture, and do not require precision machining with high tolerances. In addition, while a specific manufactured guidance dolly may not serve as a "one-size-fits-all" component for a particular domain, it is likely only guidance dollies in a few sizes may be needed to service a particular market.

Figure 5:
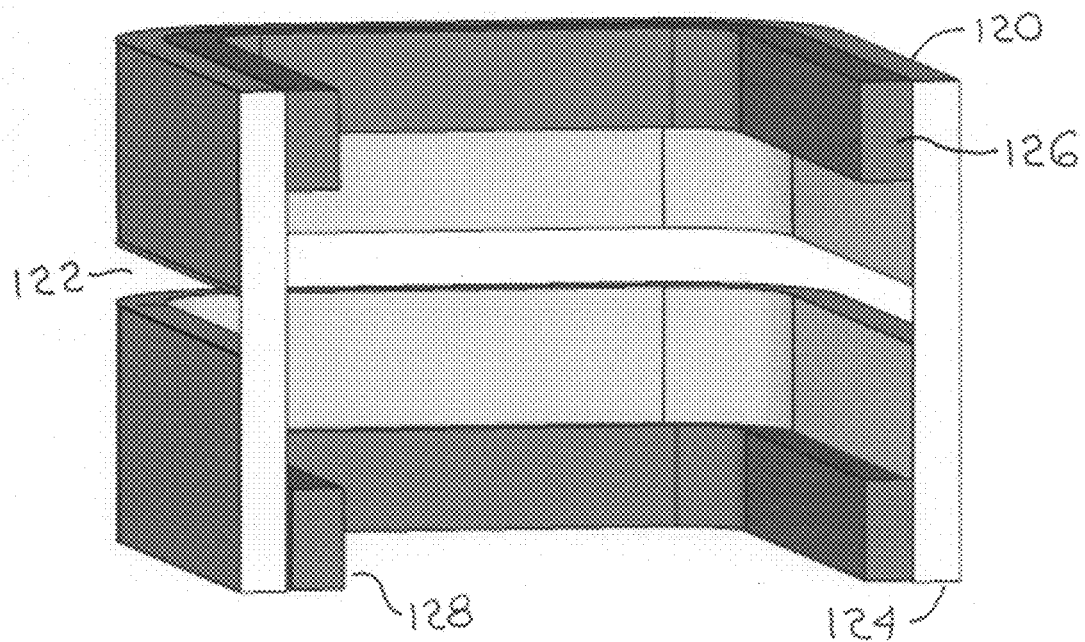
FIG. 5 is a diagrammatical view of the inside surface of a tire guidance dolly, suitable for use in the imaging, documenting, and analyzing system of FIG. 1.
Figure 6:
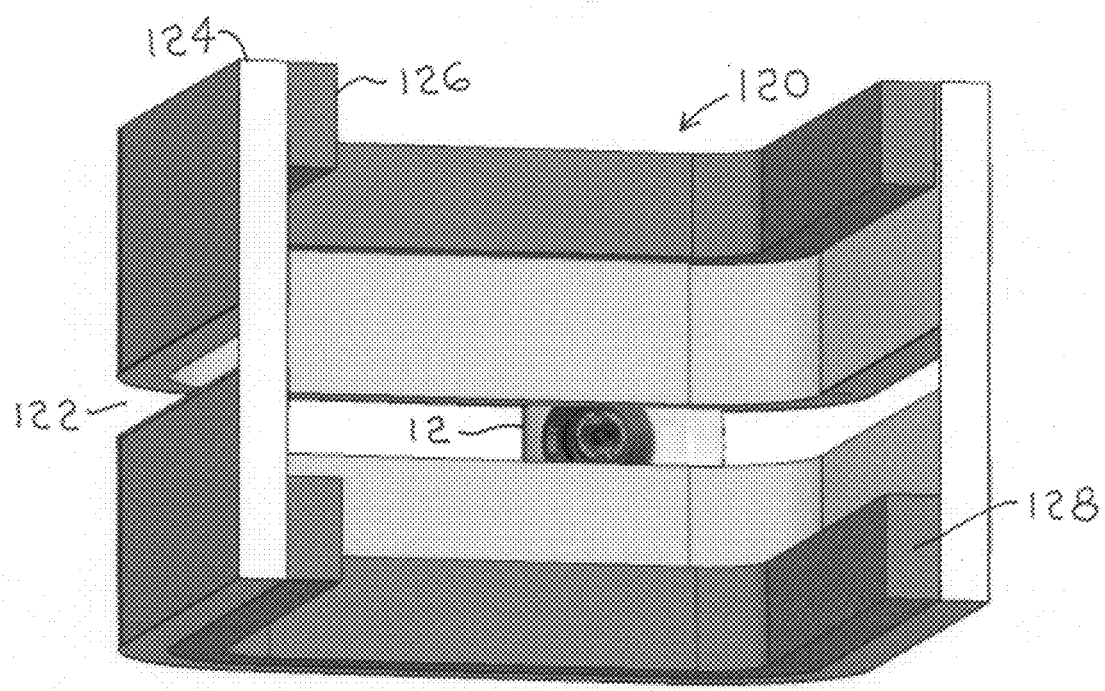
FIG. 6 is a diagrammatical view of the tire guidance dolly of FIG. 4 showing emplacement and use of a digital imaging device.

In an exemplary embodiment, a tire guidance dolly 120 may be configured in a substantially Ushape, as shown in FIGS. 5 and 6 for use in imaging the surface region and tread of an automobile tire (not shown). FIG. 6 shows the digital imaging device 12 positioned in a guidance channel 122, or latitudinal slit, of the tire guidance dolly 120. In the configuration shown, the guidance channel 122 extends along the tire tread an along both sidewalls of the tire to the respective tire beads. The tire tread guidance dolly 120 may include a relatively rigid outer frame 124, with compliant and less rigid contact strips 126, 128 on the interior of the outer frame 124. The tire guidance dolly 120 may be used to guide the digital imaging device 12 as the tire guidance dolly 120 remains in a fixed position on the tire and the digital imaging device 12 is moved laterally around the tire tread.

The guidance dolly 120 can be designed for use in the garage (on a lift) or in the field (while the vehicle is on the ground). Cars and trucks (and other vehicles such as bikes, motorcycles and planes) can both be accommodated. See Figures TA_usescase.*.

The guidance dolly 120 can also be designed in a straight path shape to move the camera over the tire in a flat path (Figure XX) Such a design allows for the placement of targets at known positions in the field of view. See Figures simplesmartphonescanner_1 and simplesmartphonescanner_2

In designing the dolly camera path, it may be worthwhile to tradeoff accuracy in favor of other considerations, such as reduced manufacturing cost or use-case flexibility. For example, it is understood that a flat path tire capture approach will omit much of the sidewall and slightly compromise capture accuracy over the tread path as the tire is slightly curved.

The accuracy tradeoff (in deviating from a curved path that more precisely follows the contours of the objects) is characterized by the distance of the surface to the camera and the angle the surface makes with the principal axis of the camera. An increase in the distance increases surface coverage for the pixel; hence results in loss of texture detail. The same effect can be attributed to the camera focal length in which the lens focal plane is non-coincident with the image plane containing sensors. The amount of texture loss (increase in distance) linearly reduces accuracy of the 3D recovery. Similar effect is observed when the angle between the surface normal and the camera principal axis increases. This is attributed to the Lamberts cosine law where the amount of light from the surface reaching the camera pixel reduces nonlinearly with cosine of the angle. Additionally, each camera pixel sees (hence averages) more surface at increased angles that reduces 3D recovery accuracy.

Another embodiment of the guidance dolly120 enables easy positioning on the ground and its shape is similar to a tire chock. This design may be more suitable for passenger tire capture when measuring cars on the ground (i.e., not on a lift), especially those with low profile tires and low wheel wells. See Figure TireScanner_TireChockl.

Another embodiment of the guidance dolly120 is similar to a rolling car lift device. See Figures rolling_tire_dolly_1 and rolling_tire_dolly_2.

Another embodiment of the guidance dolly120 will facilitate use in the field, where inclement weather may be encountered. Brushes attached to the device divert water from passing down from the top of the tire and impeding image capture. In this way, only the portion of the tire that is being scanned needs to be dried. See TireScanner_waterproof1.JPG Translation of the digital imaging device 12 is preferably performed while abiding by certain three-dimensional reconstruction constraints, such as image separation and overlap. In order to reconstruct a three-dimensional scene, each region of the tread region should be covered by at least three different digital images that may be spaced on the order of twenty degrees apart. For proper registration, each digital image preferably shares at least fifty percent of an imaged region with a previous adjacent imaged region and a successive adjacent imaged region. Upon completion of a tire tread scan, the tire guidance dolly may be moved to another location on the tire tread as desired. In some case, if the dolly is not configured with a reference frame, the reference frame can be established by exploiting known object dimensions. For example, a tire mesh coordinate system can be established using the known measurement of tire section width.

The tire section width is typically the widest dimension (i.e., tire width) measured across a latitudinal section of the tire.

Figure 7:
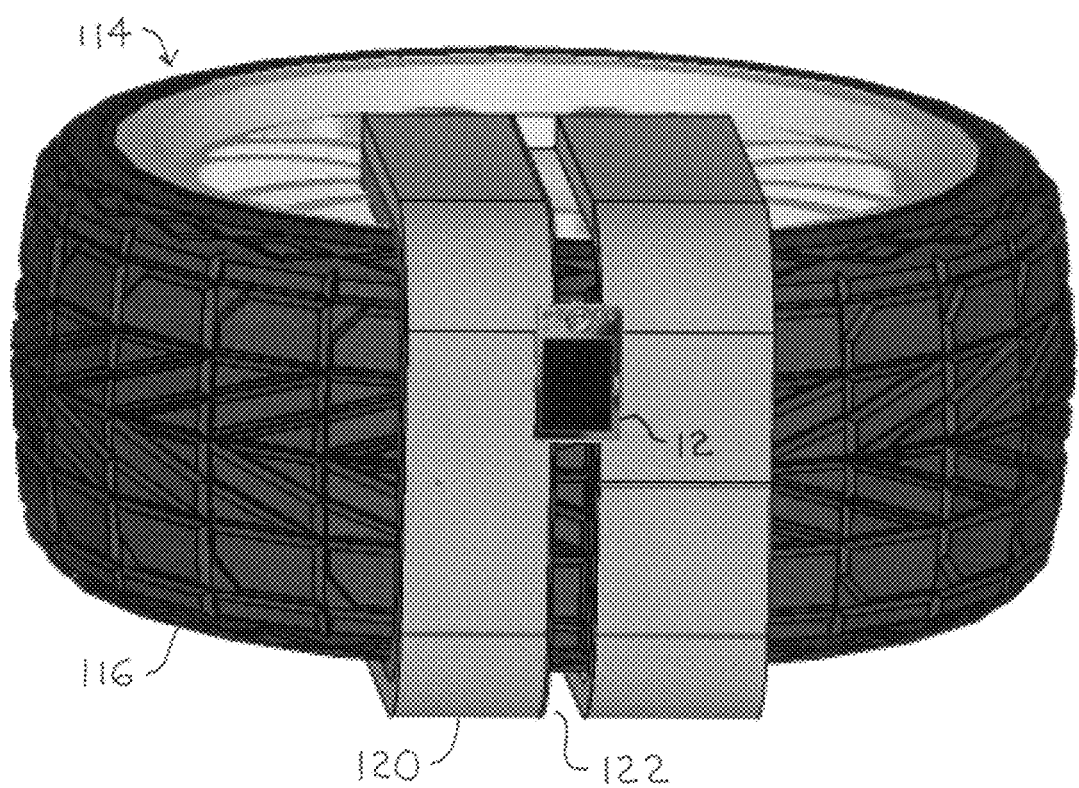
FIG. 7 is a diagrammatical view of the tire guidance dolly of FIG. 4 as may be emplaced on a tire.

The tire guidance dolly can be manually operated or motorized. If used, a motor (not shown) can be controlled by the computing device 16 in automatically guiding the digital imaging device 12 along an optimal latitudinal path, especially if physical information, such as tire geometry, is known in advance of the imaging procedure. The configuration of the tire guidance dolly 120 allows for a snug fit across the tire tread 116, as best seen in FIG. 7, similar to the snug fit of a headphone on the head of a user. The digital imaging device 12 may thus be placed against the guidance surface with the lens 42 pointed down the guidance channel 122 or latitudinal slit, and is then scanned across the tire tread 116. After completing a 'scan,' the digital imaging device 12 may upload acquired digital files to the cloud via the wireless link 54 or via the cellular link 58, or to the computing device 16, for analysis and generation of a tire report. The tire guidance dolly 120 can be designed to rotate circumferentially around a tire, after it has completed a latitudinal scan. If driven by a motor, the tire guidance dolly 120 can capture a full tread cycle on most tires after the tire dolly is mounted, without repeated operator mounts and dismounts of the tire guidance dolly 120.

It can be appreciated that the tire guidance dolly 120 can also be used for mobile analysis of the tire 114 while the tire 114 is still on the vehicle (not shown). The tire guidance dolly 120 can be used in a variety of tire-related applications, including tire retail, tire design and fleet management. The IDA software app 20 can be utilized to process a three-dimensional mesh, representing a latitudinal cross section of the tire 114, and generated as described above, into a detailed tire report. The tire report may include: (i) basic tire information, such as tread depth, (ii) diagnostics such as alignment issues, tire inflation issues, and (iii) fundamental tire engineering specifications, such as void ratio for example.

The outer frame 124 of the tire guidance dolly 120 may be fabricated from aluminum or steel, and structurally configured to flex outward so as to encompass the tire 114 in the latitudinal direction. The precise orientation may be determined by the space available within the wheel well (not shown), and in accordance with user preferences. The inside of the tire guidance dolly 120 may be lined both with low intensity diffuse lighting and a hard foam for the contact strips 126, 128. The hard foam allows the tire guidance dolly to secure tightly against the tire 114. It should be understood that it is not necessary for the tire guidance dolly 120 to fit all tires in the same manner.

The user can move the digital imaging device 12 along the tire guidance dolly 120, while keeping the orientation of the digital imaging device 12 relatively consistent in a landscape or portrait orientation. The user may thus acquire the plurality of digital images as the digital imaging device 12 is moved along the guidance channel 122. Preferably, the acquisition of digital images may begin at the point where the guidance channel 122 meets either the inside tire bead, or the outside tire bead. Acquisition of the digital images may thus continue to the other side of the tire 114. Using this procedure, the user can obtain a full latitudinal wedge of the tire 114, including both the tread and the sidewalls. The tire guidance dolly 120 can be designed to capture important raised marks on the tire tread, such as tire size information and tire Department of Transportation (DOT) data.

The user can utilize both the position of the digital imaging device 12 and the image field shown in the viewing screen 68 to determine when to capture a digital image and, if so, when to refocus or to use existing focus. For example, the user may slow the movement of the digital imaging device 12 during extreme changes in curvature, such as around the tire shoulder. Depending on the orientation of the digital imaging device 12, size of the image sensor 44, and desired resolution, it is expected that about forty digital images may be required to reconstruct an adequate mesh for a conventional tire, in accordance with best videogrammetry practice.

In an exemplary embodiment, the acquired plurality of digital images can be stored in the digital memory 48 that may comprise a removable component, such as a flash memory card or an external drive. The acquired digital images may thus be uploaded and analyzed independently of the digital imaging device 12. The uploaded, or stored, digital images can be processed using the IDA software app 20 at a facility remote from the digital imaging device 12 and/or the computing device 16.

Figure 4:
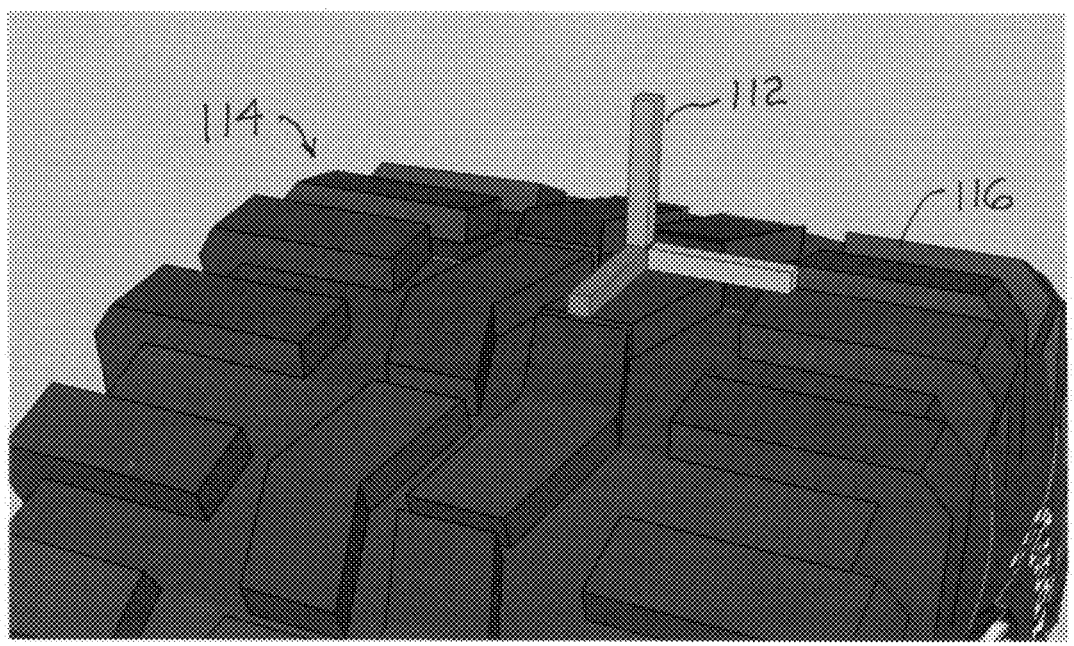
FIG. 4 is a diagrammatical view of a reference included in an imaging process for a tire tread.

If the reference frame is provided, as shown in FIG. 4, the reference frame can be identified and measured with the three-dimensional mesh, thus establishing a reference dimension/coordinate system. If the reference frame is not provided, the operator can exploit the easily accessible tire dimensions that are branded on the tire sidewall. In one method, the user can establish a reference frame by orienting the tire wedge to obtain a measurement of the widest section, in voxels. The ratio of voxels to known section width, for example, a section width of 250 mm, can establish a reference frame. Alternatively, a reference object (or objects) of known dimension can be placed in the image, similar to the reference object 98 shown in FIG. 3. The reference object is of known dimension, integrated with the guidance dolly and seamlessly placed in the scene when the guidance dolly is situated on the object being scanned and imaged.

Given the extremely close distance between camera and objects, it may be desirable to integrate the reference frame with the dolly. See Figures Targets_1 and Targets_2. Note that the targets are placed in known positions in the field of view as part of the dolly enclosure. Also note that the target frame is rigid and that once the dolly is set up, the target frame (and objects) lie much closer to the object than the camera.

Figure 8:
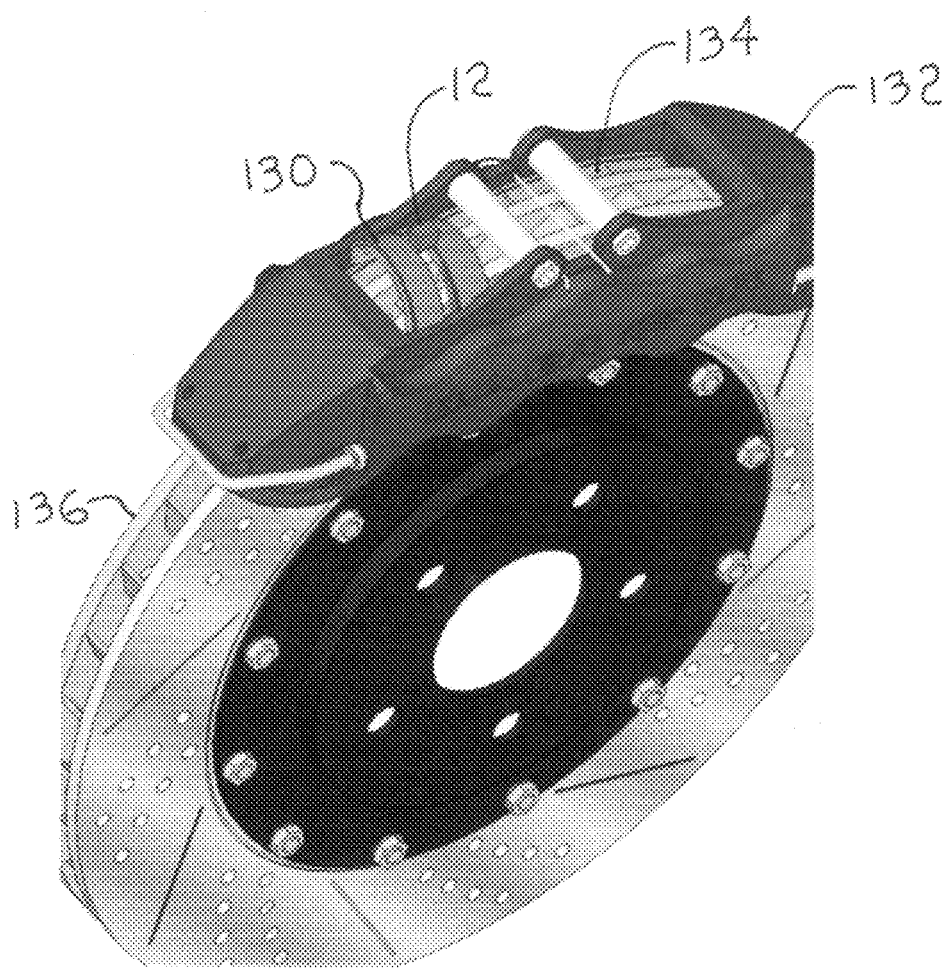
FIG. 8 is a diagrammatical view of a brake pad guidance dolly positioned in a wheel caliper.

In an exemplary embodiment, the disclosed system and method can be applied to the evaluation and analysis of wear on a disc brake pad. In particular, FIG. 8 shows a brake pad guidance dolly 130, configured for emplacement over or inside a brake caliper 132 of a disc brake assembly, and thus used as a quick and easy way to assess brake pad and rotor thickness. When positioned as shown, the digital imaging device 12 can be used to evaluate wear on either or both the disc pad 134 and the rotor 136. For clarity of illustration, the digital imaging device 12 is shown as a small box-like component. Brake wear across the disc pad 134 can also be used to diagnose suspension and alignment problems.

Preferably, mesh characteristics obtained with the brake pad guidance dolly 130 may be cross referenced with dimensional data, such as may be available from manufacturer schematics, pictures, and tables, to generate a ground reference. As shown in the illustration, the disclosed method may enable a user to measure brake pad wear by looking through the brake calipers 132, that is, without the need to remove the brake pads 134 from the axle. The plurality of digital images may be acquired for derivation of the three-dimensional mesh, starting from an inner brake pad backing to an outer brake pad backing, or in the reverse direction.

Brake pad analysis, in the present state of the art, typically requires removal of the wheel. The brake pad caliper may then be disengaged from the rotor by popping a spring. The brake pads are removed from the caliper and measured using a brake lining gauge. However, surface wear patterns on the disc brake pad may be difficult to distinguish by visual inspection alone.

Figure 9:
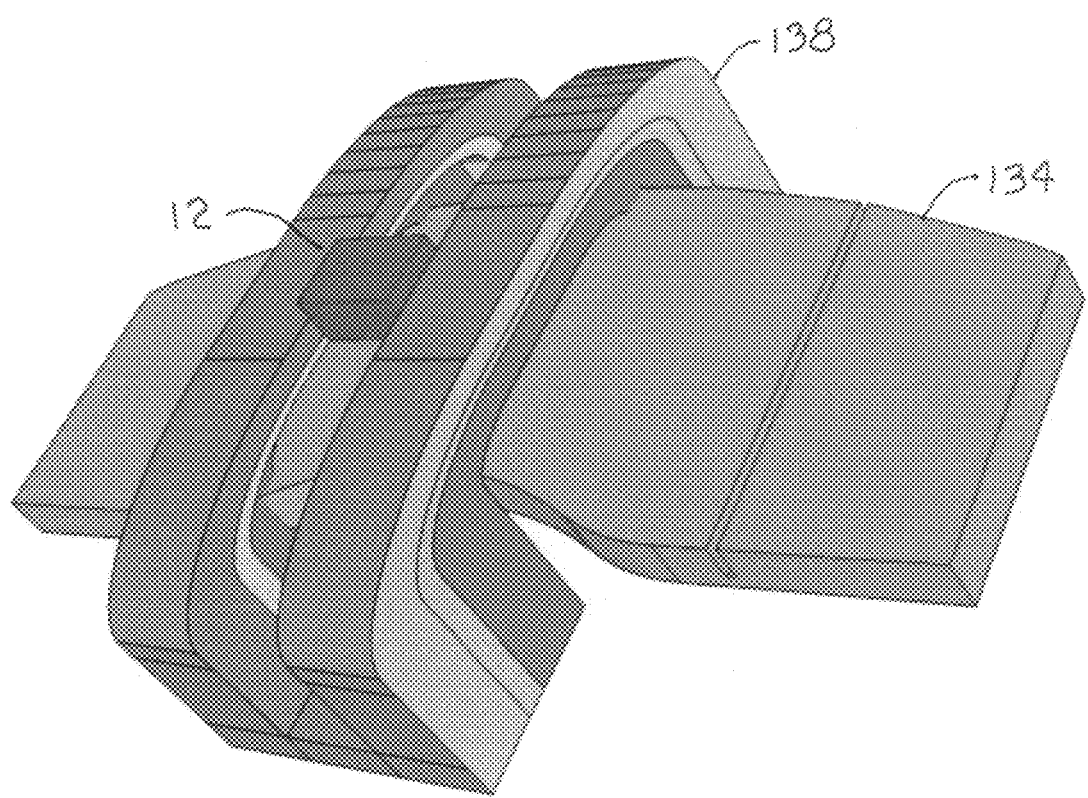
FIG. 9 is a diagrammatical view of a brake pad guidance dolly positioned on a brake pad.

The brake pad guidance dolly 130 may be used to simplify and improve the brake pad diagnostic process and provide a visual audit trail. The rotor side of the disc brake pad 134 is placed below the brake pad guidance dolly 130 in such a way that the digital imaging device 12 can move across the guidance surface of the brake pad guidance dolly 130. The three-dimensional mesh derived from the sequence of digital images can be analyzed by the IDA software app 20 for matching against the known wear pad surface patterns. If desired, a different configuration of a brake pad guidance dolly 138 may be used to assess the surface characteristics of essentially the entire disc brake pad 134, as shown in FIG. 9. For clarity of illustration, the digital imaging device 12 is shown as a small box-like component.

Figure 10:
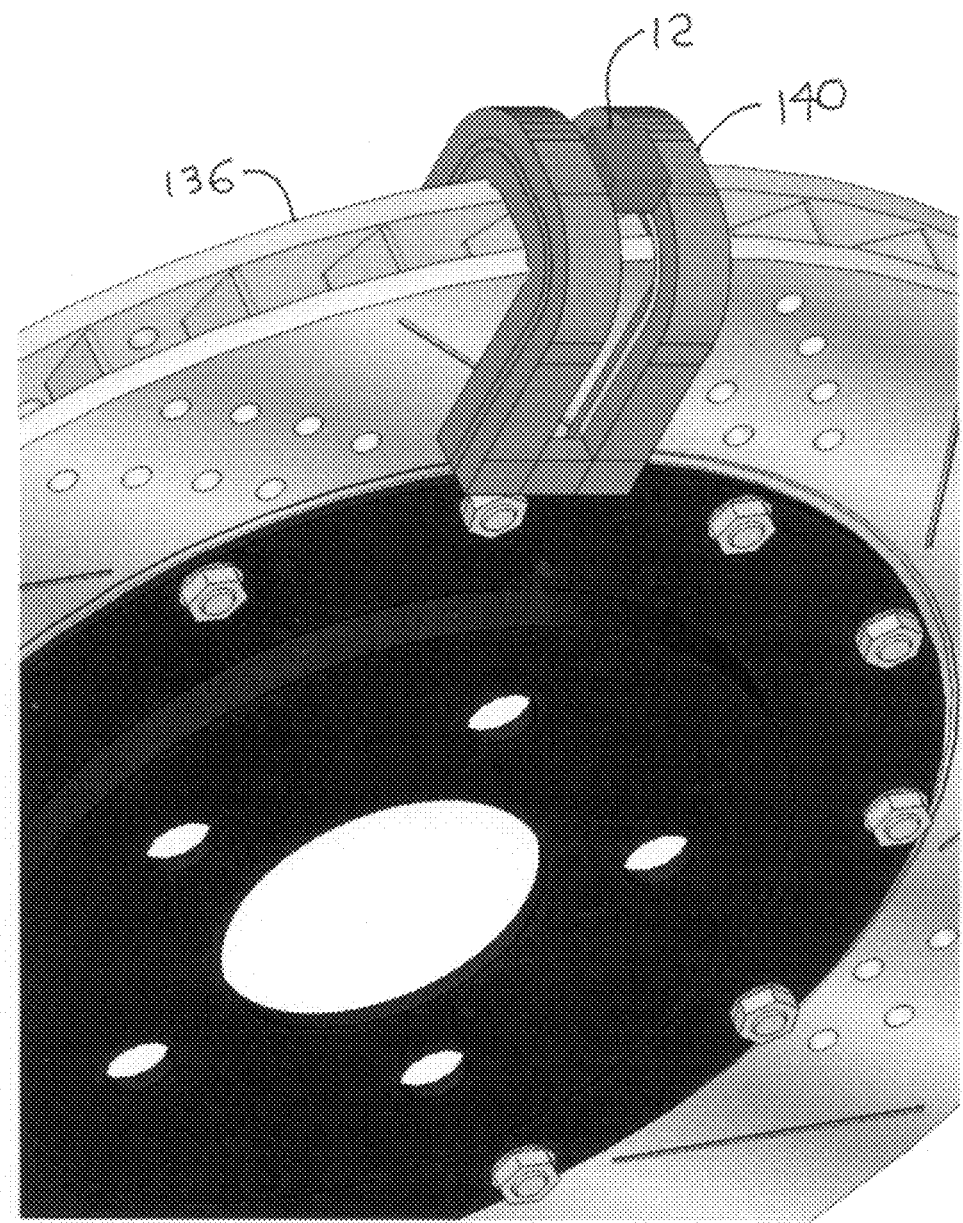
FIG. 10 is a diagrammatical view of a brake rotor guidance dolly positioned on a brake rotor.

As well-known in the relevant art, whether or not a disc brake rotor should be replaced is typically determined by measuring the remaining thickness of the disc brake rotor, and determining the surface runout of the rotor. The IDA system 10 can provide such an assessment, as in FIG. 8, even when the disc brake rotor 136 remains "in place" and the wheel or the brake caliper 132 is not removed. In certain applications, the disc brake rotor 136 can be dismounted, as it would be with a traditional examination, and a different configuration of a disc brake rotor guidance dolly 140 can by placed over the rotor 136, as shown in FIG. 10. For clarity of illustration, the digital imaging device 12 is shown as a small box-like component. Although this alternate inspection procedure also requires removal of the rotor 136, the present method and system offer an advantage over conventional inspection methods by also providing to the user an electronic assessment of rotor thickness and runout by utilizing the IDA software app 20.

In an exemplary embodiment, while rotor and wheel are mounted, the brake rotor guidance dolly 140 may be used to acquire digital images as the digital imaging device 12 is being moved transverse to the rotor 136, that is, along the direction of the wheel axis of rotation. The process of three-dimensional image reconstruction will generate a rotor "wedge," similar to the tire wedge described above that can be obtained via tire guidance dolly 120 reconstruction. The diameter of the rotor 136, in voxels, may be estimated from rotor wedge by finding a bestfit cylinder, for example.

The "real world" diameter of an imaged rotor can be found using different approaches, such as, a table lookup from VIN rotor specifications, or by retrieving the identification data stamped on the dismounted rotor itself. The diameter of the brake rotor guidance dolly 140 can then be used to set up a reference system, and determine the thickness of the rotor 136. As can be appreciated, it is possible to sample the thickness of the rotor 136 across different locations (i.e., radially) to determine runout.

Figure 11:
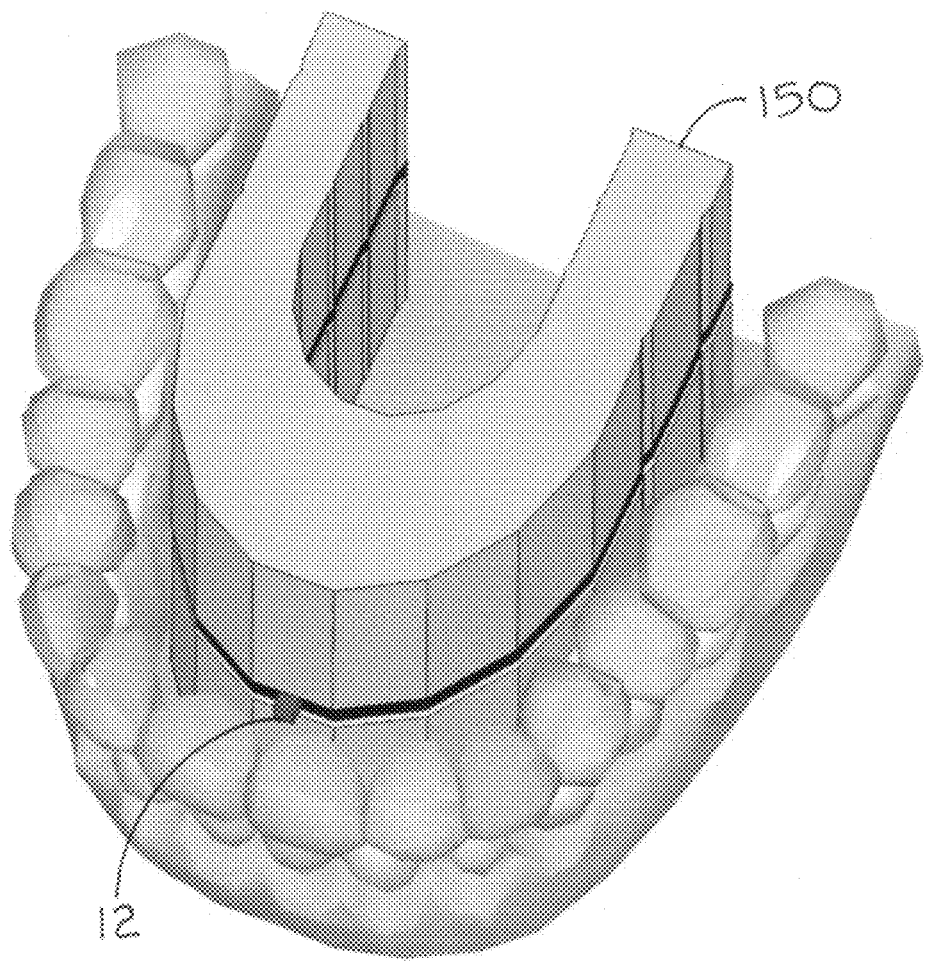
FIG. 11 is a diagrammatical view of a dental dolly positioned inside the mouth of a patient.

A dental guidance dolly 150, shown in FIG. 11, can be used by a dental professional to assess patient gum and tooth wear. The dental guidance dolly 150 is substantially Ushaped and configured to be worn like a mouth guard. For clarity of illustration, the digital imaging device 12 is shown as a small box-like component. The dental guidance dolly 150 can be stabilized in the mouth by having the patient clench down slightly when the dental guidance dolly 150 is in the mouth. In accordance with the disclosed method, the dental guidance dolly 150 may be used to provide an ongoing, textured, three-dimensional model of the teeth and gums of a patient.

The dental guidance dolly 150 can be raised or lowered in the mouth by inserting one or more spacers on the bottom surface of the dental guidance dolly 150. Using the spacers, an adequate number of three-dimensional meshes can be acquired such that the acquired meshes will be representative of some or all of the interior tooth and gum surfaces of the mouth of the patient. Similarly, an outer tooth dental guidance dolly (not shown) can be used to generate three-dimensional meshes for the outer teeth and gums.

Figure 12:
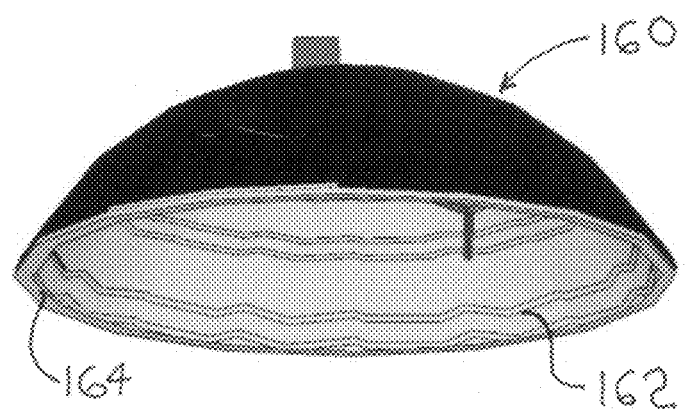
FIG. 12 is a diagrammatical view of a skin guidance dolly showing a spiral guidance path.
Figure 13:
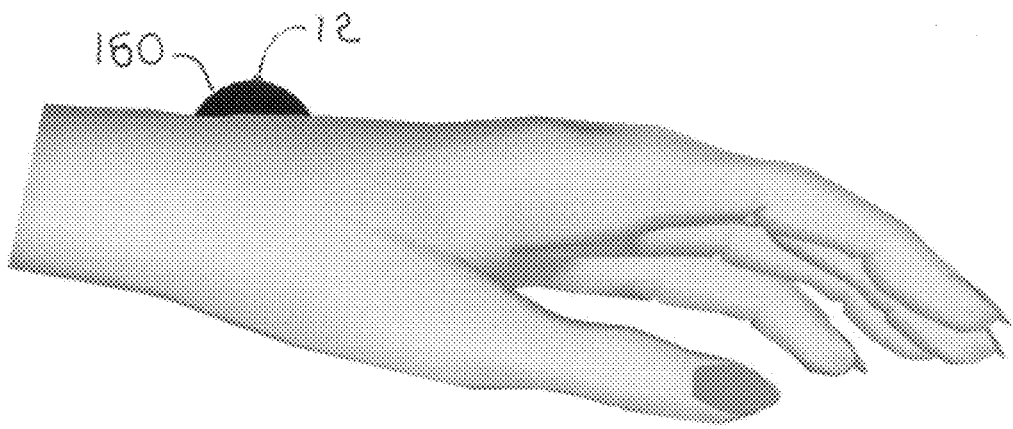
FIG. 13 is a diagrammatical view of the skin guidance dolly of FIG. 11 as may be emplaced on the skin of a patient.

A skin guidance dolly 160, shown in FIG. 12, is configured in a substantially hemispherical shape for use by a dermatologist to monitor the growth of moles and blemishes on the skin of a patient. The skin guidance dolly 160 can be mounted to a flexible arm (not shown), adjusted over a skin mole, and secured into position such that the skin area with the mole is substantially enclosed by the skin guidance dolly 150, as shown in FIG. 13. During the process of imaging, the digital imaging device 12 is positioned in a spiral-shaped channel 162 or slot provided in the housing of the skin guidance dolly 160.

The digital imaging device 12 is moved along the channel 162 and defines a helical path, much like a mountaineer descending switchbacks. For clarity of illustration, the digital imaging device 12 is shown as a small box-like component. In an exemplary embodiment, the spiral channel 162 or slot extends from the top region of the skin guidance dolly 160 to the base 164 such that the field of view of the digital imaging device 12 encompasses primarily the skin surface of the patient adjacent the region that includes the mole itself.

Figure 14:
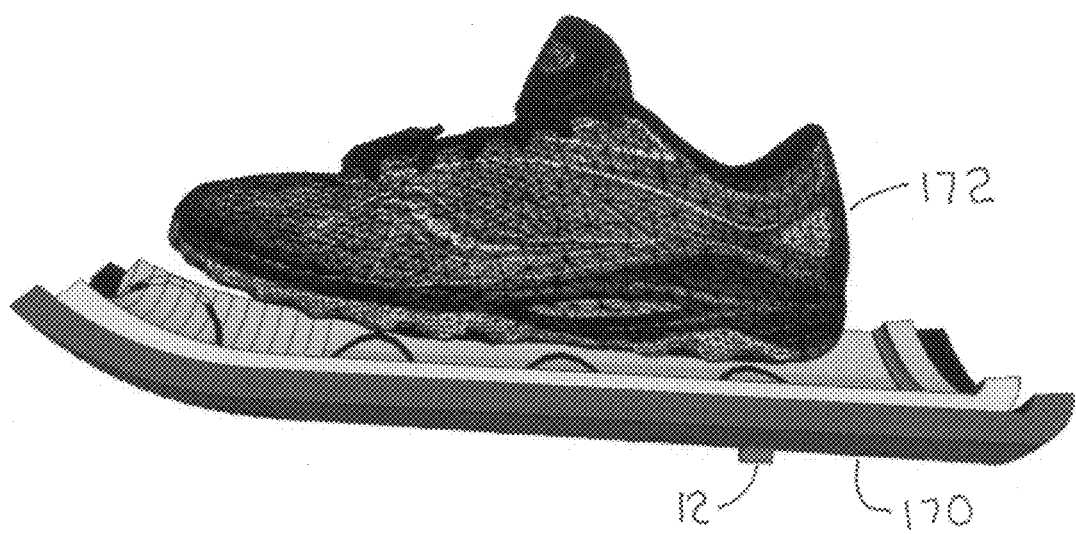
FIG. 14 is a diagrammatical view of a running shoe guidance dolly as may be used on the underside of a running shoe.
Figure 15:
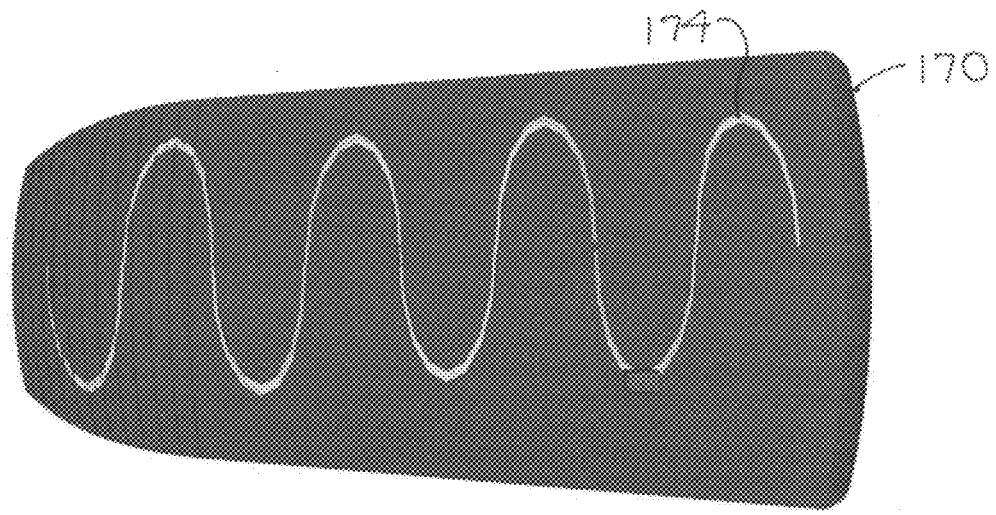
FIG. 15 is a diagrammatical view of an undulating guidance path on the running shoe guidance dolly of FIG. 13.

A running shoe guidance dolly 170, shown in FIG. 14, can be used by podiatrists and sports professionals to better assess walking and running issues. The running shoe guidance dolly 170 may be placed over the sole of a user running shoe 172. The digital imaging device 12 may then be moved along a curved zig-zag path or channel 174, as shown in FIG. 15. For clarity of illustration, the digital imaging device 12 is shown as a small box-like component. Preferably, the digital imaging device 12 is "swept" over the underside of the running shoe 172 such that most or all of the sole, heel, and toe is imaged by the digital imaging device 12. Accordingly, the running shoe guidance dolly 170 can be used to assess wear patterns across the underside of the running shoe 172. Wear pattern identification can be helpful for many uses, including the design of sole inserts for the purpose of correcting stride.

Figure 16:
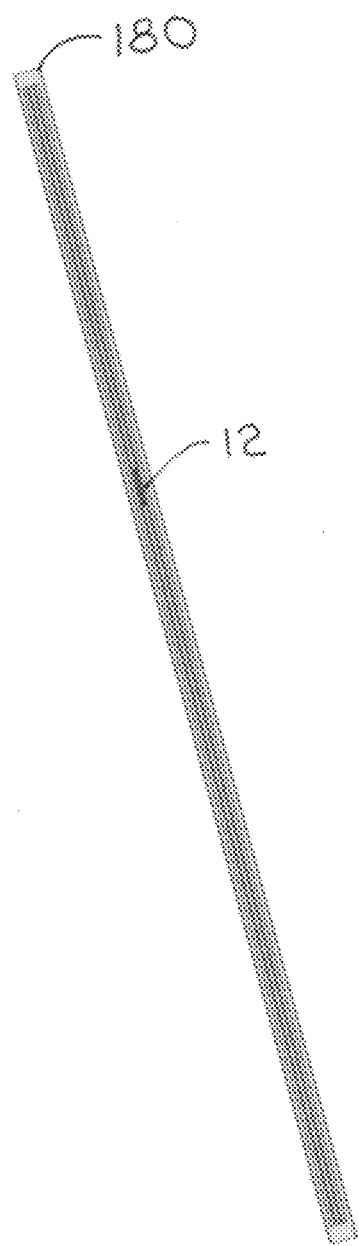
FIG. 16 is a diagrammatical view of a car scratch guidance dolly.
Figure 17:
FIG. 17 is a diagrammatical view of a tire dolly attached to the front, passenger tire.
Figure 18:
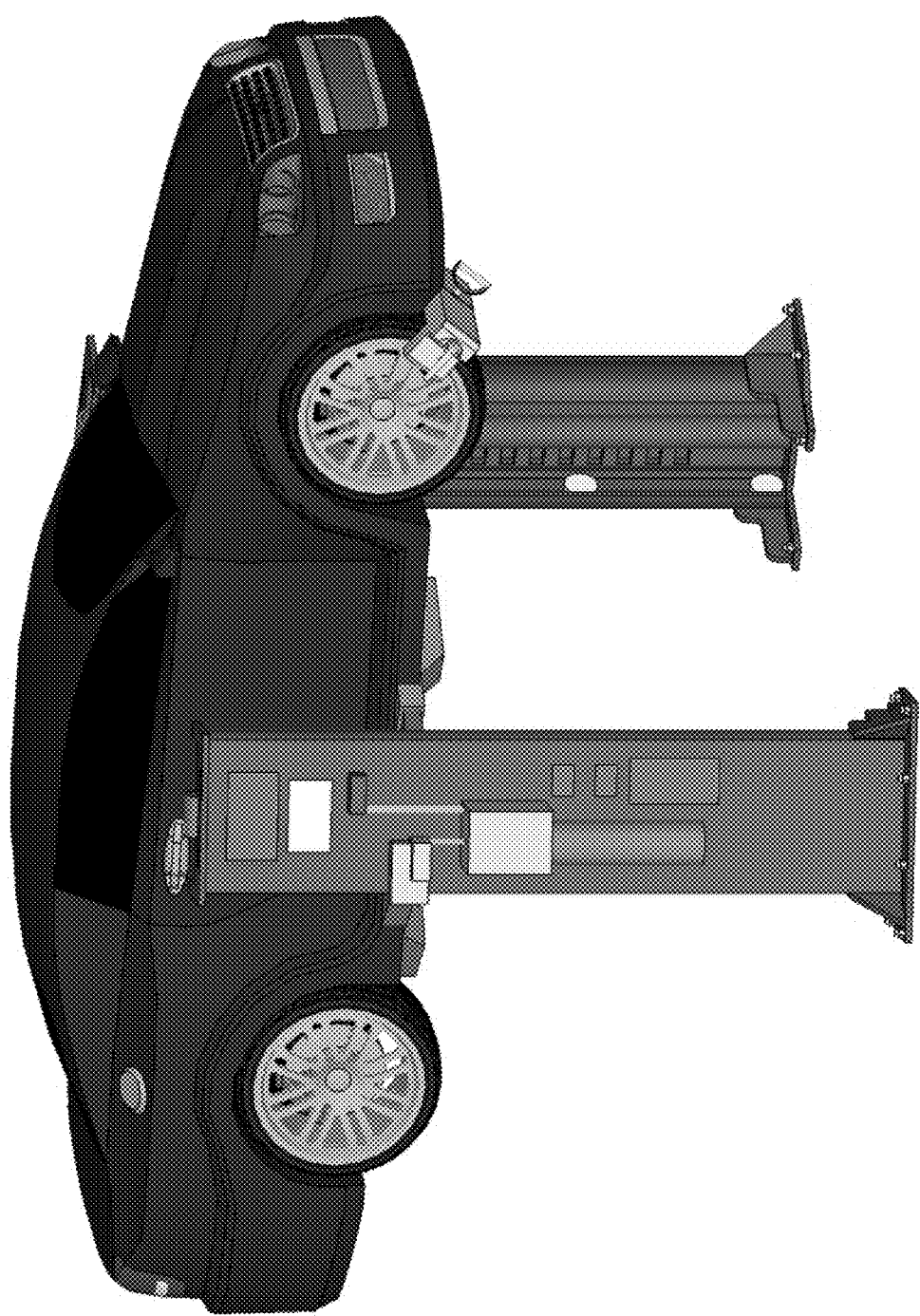
FIG. 18 is a diagrammatical view of a tire dolly attached to the front, passenger tire while the car is on a lift.
Figure 19:
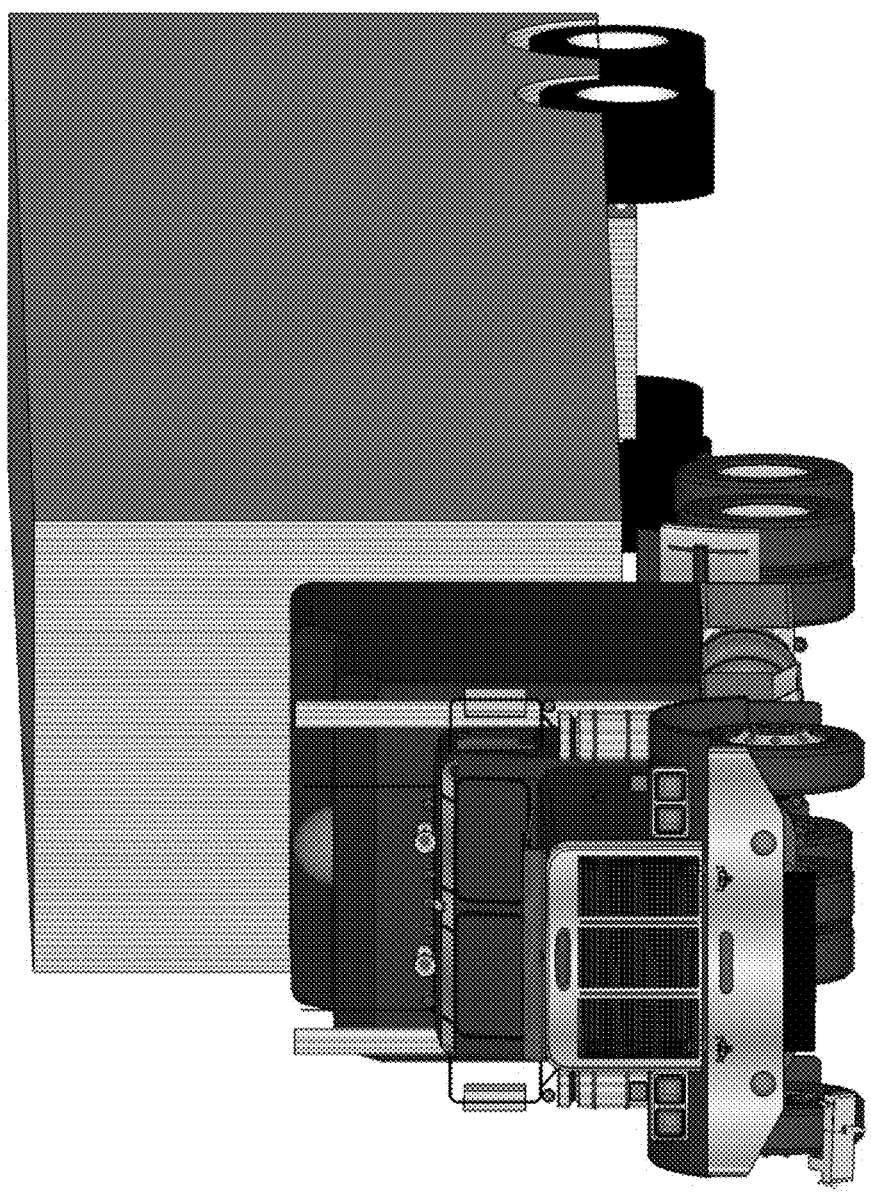
FIG. 19 is a diagrammatical view of a tire dolly attached to the one of the steer tires on a truck.
Figure 20:
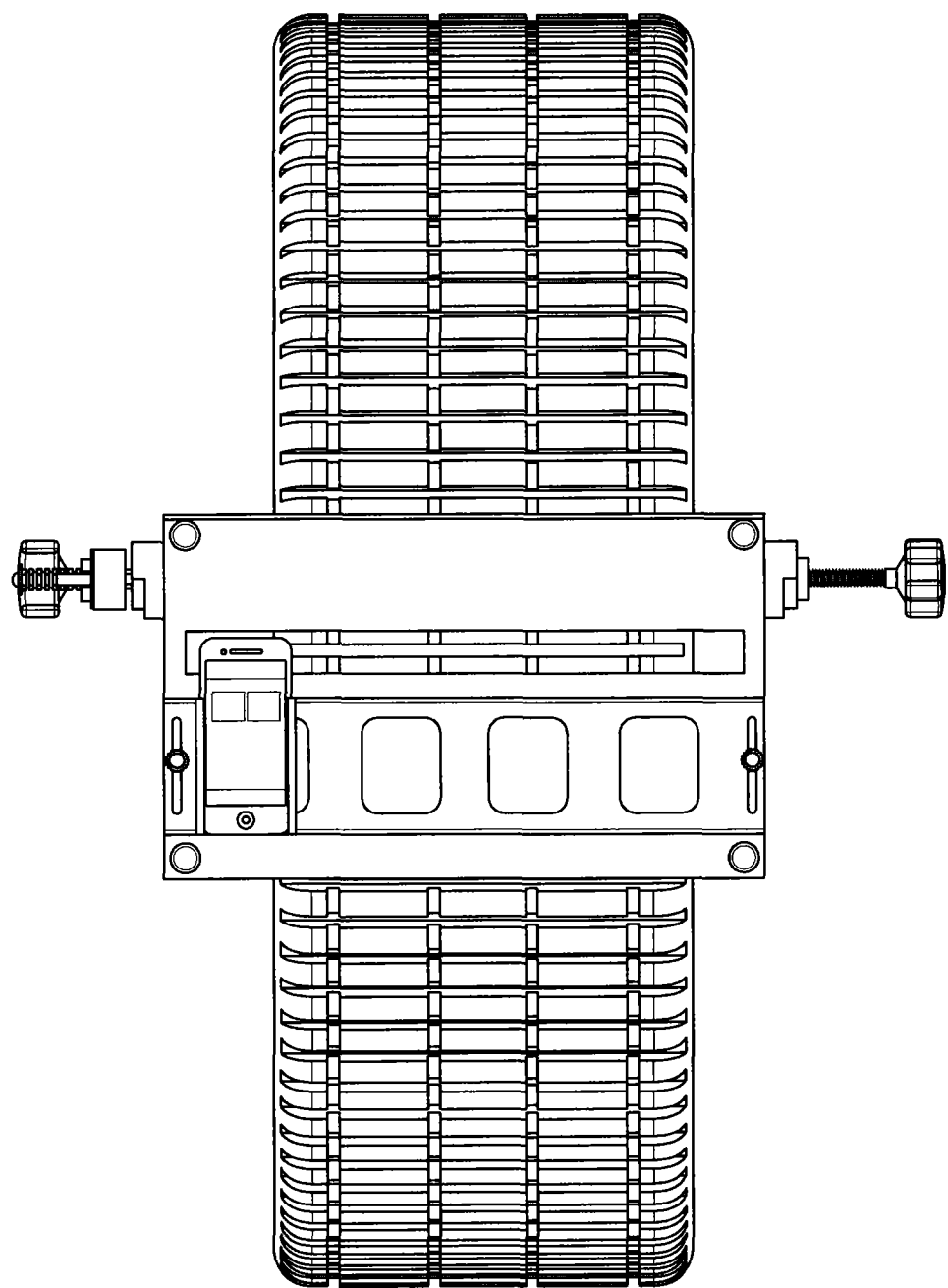
FIG. 20 is a diagrammatical view of a tire dolly where the camera moves in a straight, flat path over the tread. A smart phone is used for the camera.
Figure 21:
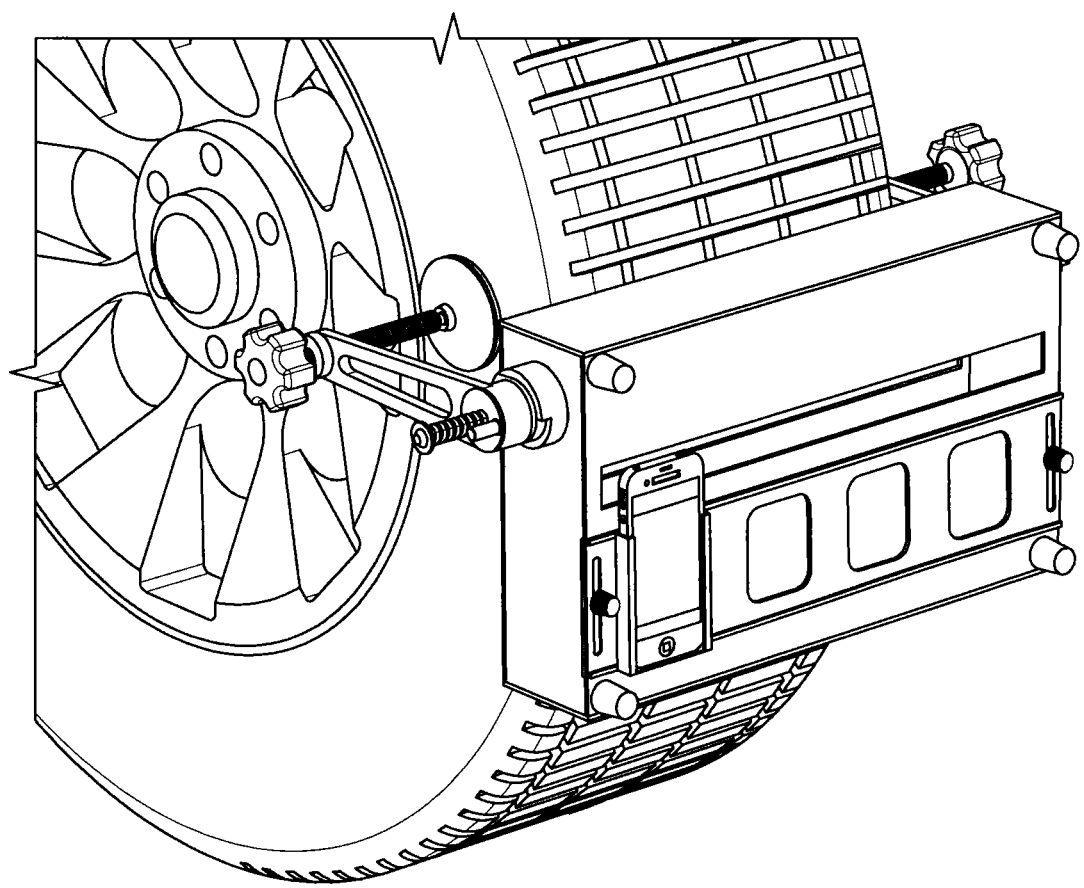
FIG. 21 is a diagrammatical view of a tire dolly where the camera moves in a straight, flat path over the tread, where a smart phone is used for the camera.
Figure 22:
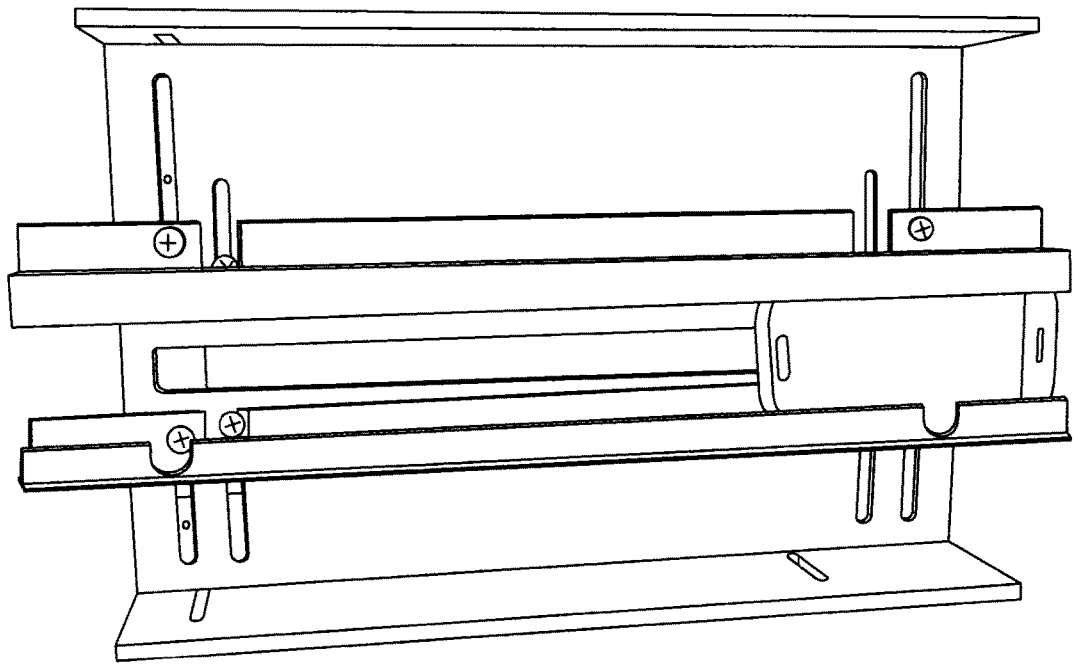
FIG. 22 is a diagrammatical view of a tire dolly where the camera moves in a straight, flat path over the tread. A smart phone fits in the rail and moves in a straight path over the tire.
Figure 23:
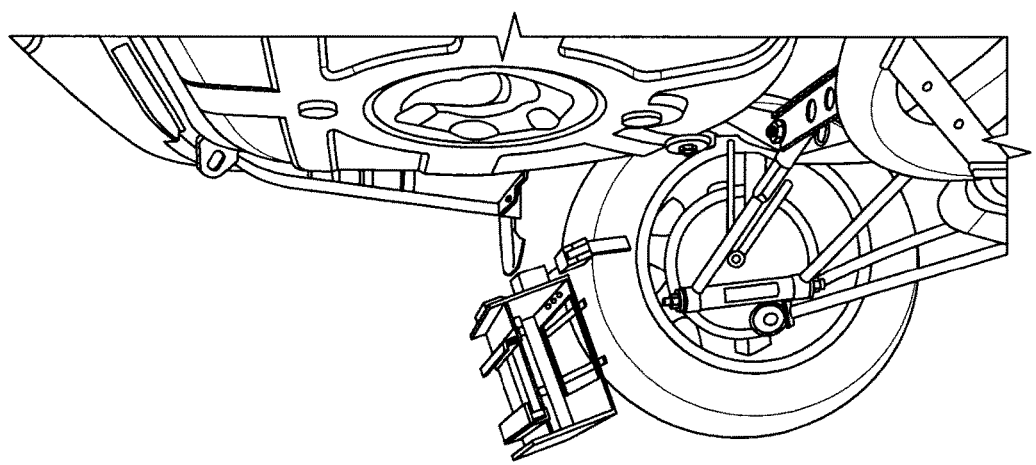
FIG. 23 is a diagrammatical view of a tire dolly.
Figure 24:
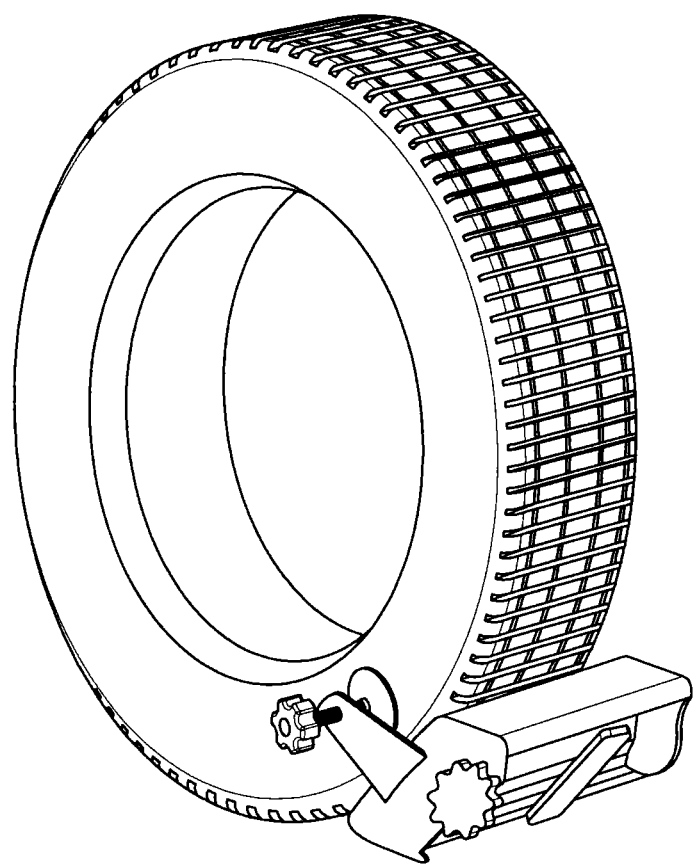
FIG. 24 is a diagrammatical view of a tire dolly that is oriented to the tire like a tire chock.
Figure 25:
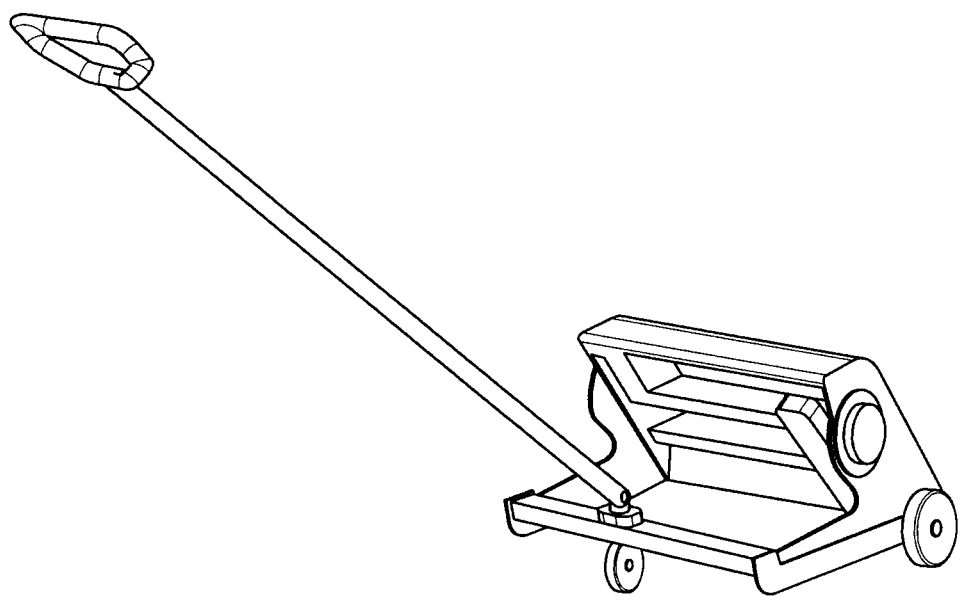
FIG. 25 is a diagrammatical view of a rolling tire dolly.
Figure 26:
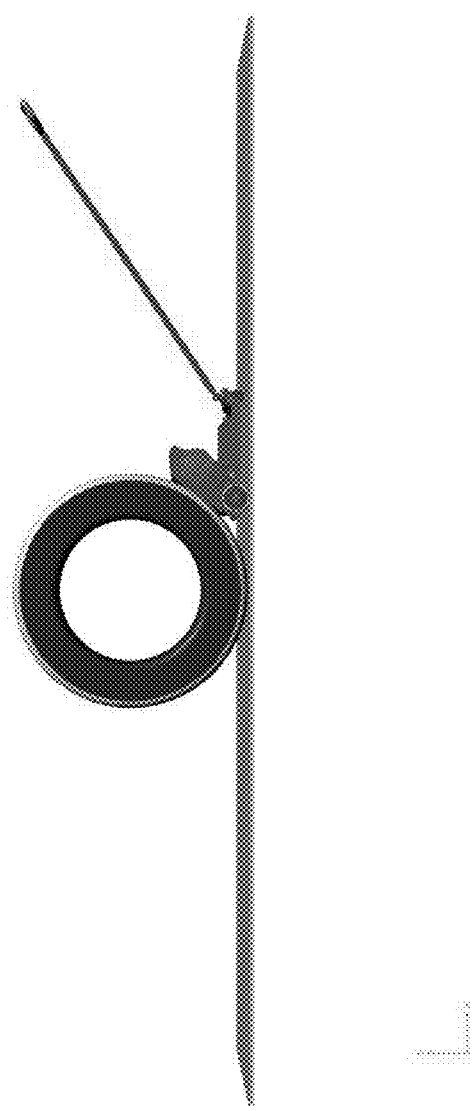
FIG. 26 is a diagrammatical view of a rolling tire dolly.
Figure 27:
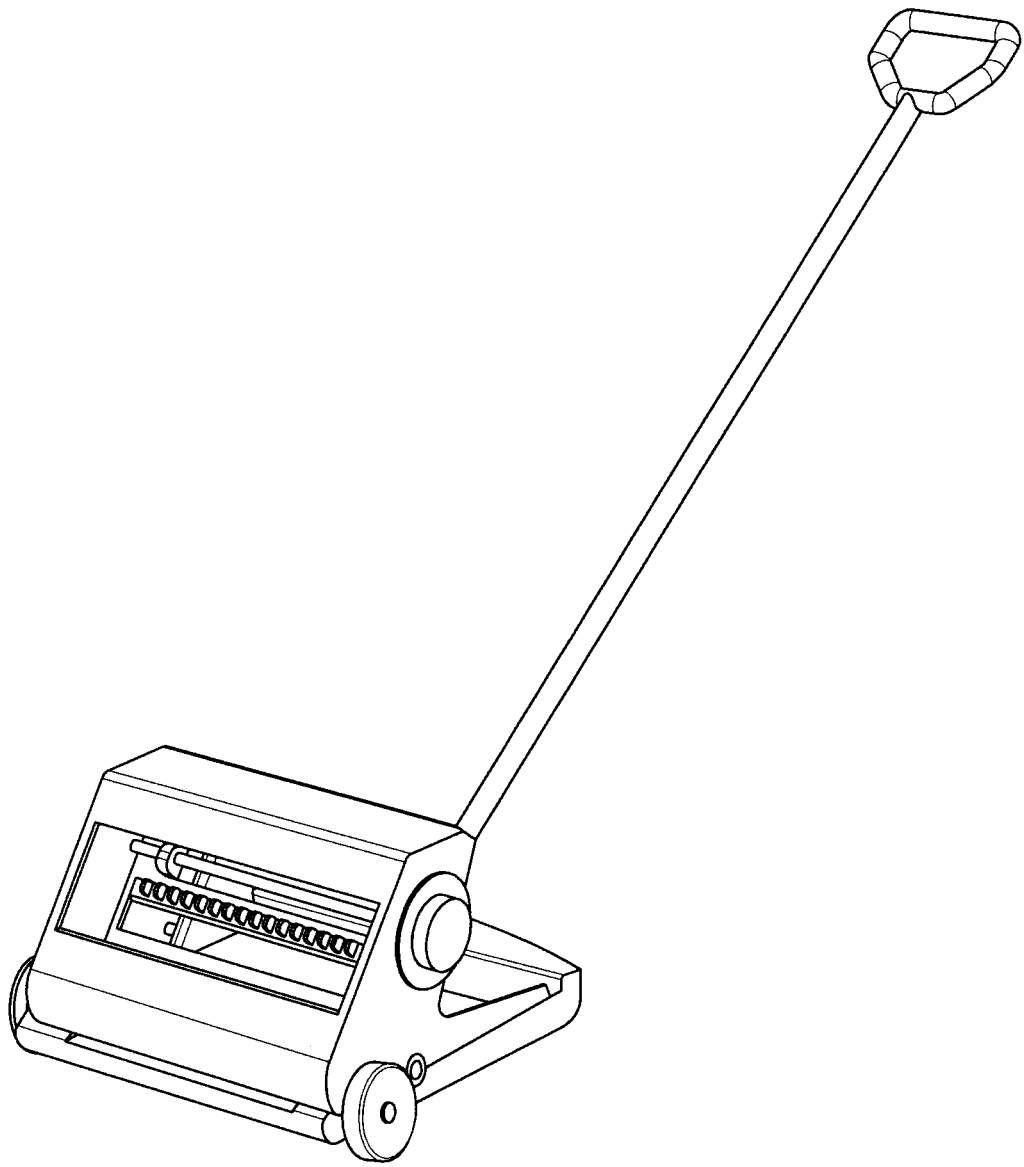
FIG. 27 is a diagrammatical view of a rolling tire dolly.
Figure 28:
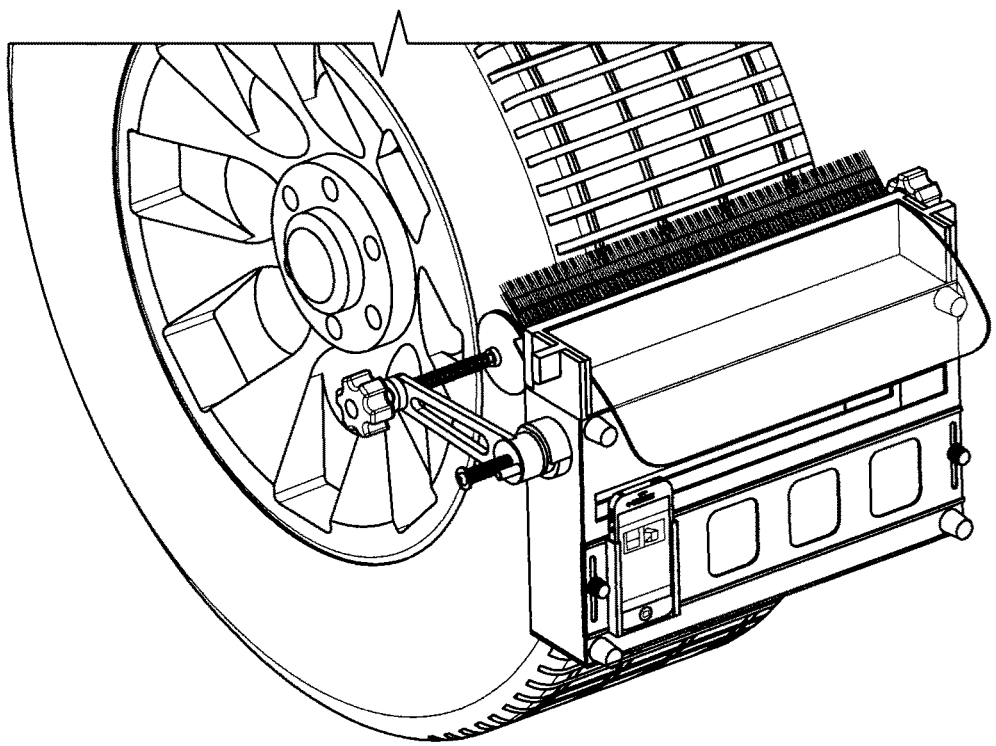
FIG. 28 is a diagrammatical view of a water resistant tire dolly.
Figure 29:
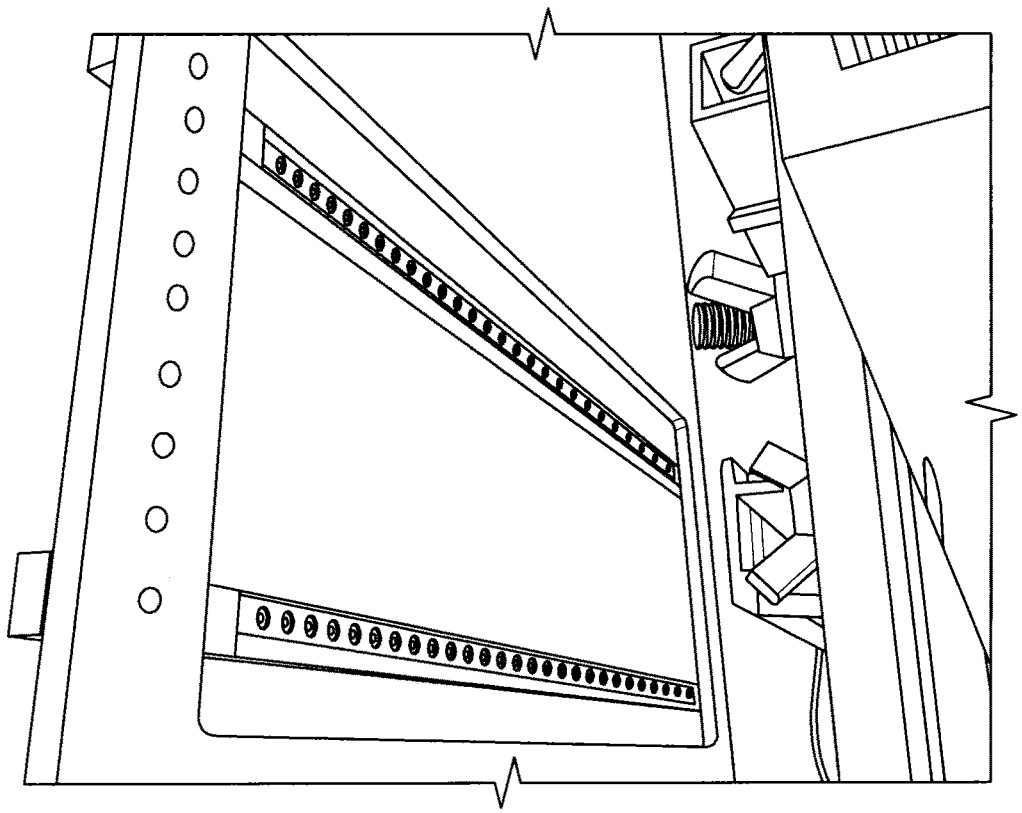
FIG. 29 is a diagrammatical view of a tire dolly showing targets in the field of view.
Figure 31:
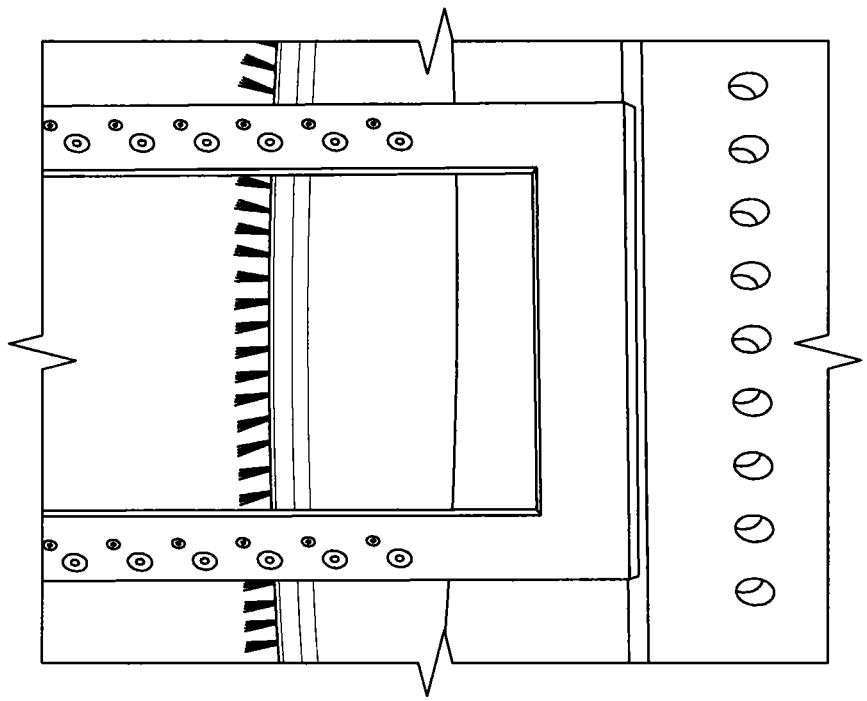
FIG. 31 is a diagrammatical view of a tire dolly placed over a tire and showing targets in the field of view.
Figure 30:
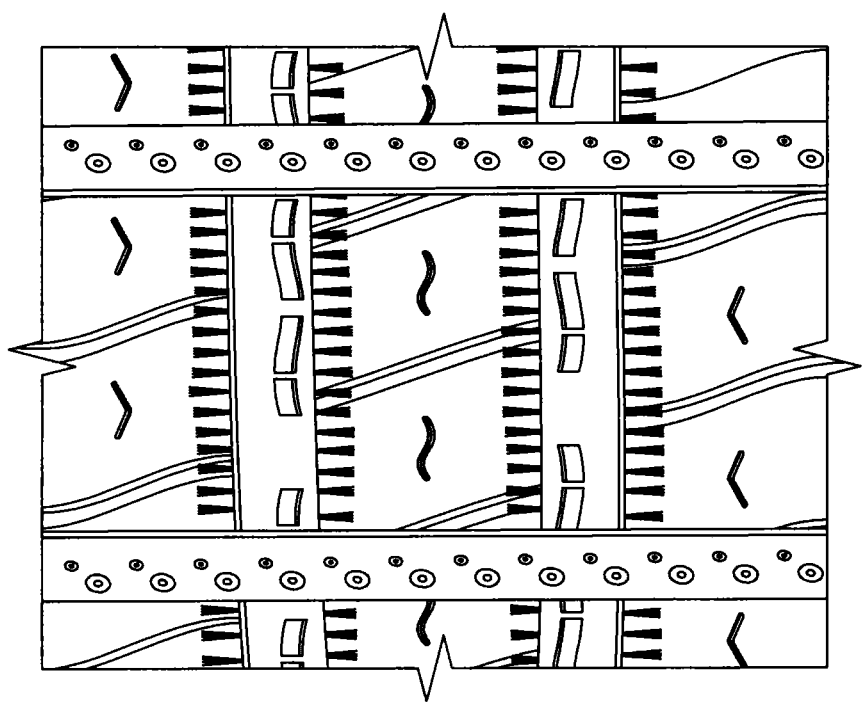
FIG. 30 is a diagrammatical view of a tire dolly placed over a tire and showing targets in the field of view.

A car scratch guidance dolly 180, shown in FIG. 16, can be used by claims adjusters, automotive body shops, and car rental companies to assess the repair cost of a scratch. A lighted side of the car scratch guidance dolly 180 is placed over the scratch region of an automobile. The digital imaging device 12 may be moved up and down in one or more parallel channels or paths so as to obtain the plurality of digital images, in accordance with best videogrammetry practice. For clarity of illustration, the digital imaging device 12 is shown as a small box-like component.

In yet another application, a router bit guidance dolly (not shown) can be used to examine expensive industrial router bits for wear and possible replacement. Analysis of wear pattern can also be used to assess other possible problems. For example, the router may need to be adjusted, or the machinist using the router bit may require additional training. In accordance with the disclosed method, the router bit may be clamped in a vertical orientation, such that the router bit guidance dolly encircles the router bit.

The digital imaging device 12 may be translated about the router bit in a descending or ascending helical path, and acquire the plurality of digital images needed to generate a three-dimensional mesh. A reference system may be established using one of more physical dimensions of the router bit, such as the shank dimension or the router diameter. Preferably, the physical dimension is taken at a region of the router bit least susceptible to wear, and then crosschecking the physical measurements from the threedimensional mesh with ground reference, with expected measurements.

It is also possible to check the three-dimensional mesh shape, and compare planar cross sections of the three-dimensional mesh, with a CAD-like drawing of the router bit. This may be helpful if, for example, the router bit is worn, has been chipped, or if the profile of the router bit has an extremely curved shape and is difficult to specify by measurements.

In an exemplary embodiment, a timing belt (not shown) may be inspected using the advantages of videogrammetry as described above. If necessary, a timing belt replacement may be required based on the results of the inspection. A timing belt guidance dolly (not shown) may be used to pivot around the timing belt and capture a three-dimensional mesh. A variety of techniques can then be used to identify the type of timing belt being analyzed. The part number for a timing belt encodes three parameters: pitch length, pitch, and belt width. The three-dimensional mesh can also be used to identify characteristics of belt teeth, such as pitch and profile. Other characteristics, such as total tooth count or diameter, may be helpful in completely identifying the replacement timing belt. In another analytical approach, a plurality of varying perspective images of the timing belt may be obtained to produce the three-dimensional mesh.

The basic guidance dolly may be operated by a single operator, if desired. The operator positions the guidance dolly with respect to the target object 18, moves the digital imaging device 12 across the guidance dolly, focuses the digital imaging device 12 when necessary, and captures a plurality of digital images conforming to best videogrammetric practice. After a scan has been completed, the digital memory 48 may be removed, and the stored data may be uploaded, as described above. To the extent possible, operator involvement is minimized.

In an exemplary embodiment, the digital imaging device 12 can be driven by a programmable motor, so as to translate the digital imaging device 12 about the target object 18 in a manner such that the plurality of digital images can be acquired. The programmable motor may interact with the digital imaging device 12, and initiate focus or image capture at specified locations on the trajectory in order to insure adequate digital image overlap.

Moreover, a smart phone can be used to speed up processing. The smart phone can use machine vision techniques as well as on-board sensors. For example, a gyroscope can be used to infer object criteria that may indicate more detail is need at a particular location, such as tire grooves. When such additional detail is needed, the digital imaging device 12 may be moved at a slower pace, or may change focus accordingly. Image capture time can be minimized by continuously moving the digital imaging device 12 around the guidance dolly 14, and capturing pictures in burst mode. Stability can be achieved using techniques similar to that of camera gimbals. The IDA software app 20 can be simplified to run on a smartphone camera, obviating the latency time to upload pictures. The guidance dolly 14 can use the smart phone to dynamically adjust lighting prior to a scan. Machine vision onboard the smartphone can help discern and optimize the amount of lighting based on interest points observed.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

What is claimed is:

1. A system for use in monitoring observable changes to a selected surface region of a target object, the system comprising:
   a single digital imaging device acquiring a plurality of two-dimensional image files of the selected surface region;
   a guidance dolly for placement against the target object when the plurality of two-dimensional image files are being acquired, the guidance dolly having a contact surface defining a trajectory path for the digital imaging device, the trajectory path defined about the selected surface region of the target object;
   a computing device storing a set of instructions, the set of instructions comprising:
      converting the plurality of two-dimensional image files into a three-dimensional image file representative of the selected surface region; and
   a reference frame acquired in said plurality of two-dimensional files of the target object, wherein the set of instructions further comprises correlating image pixels between at least two, two-dimensional image files using the reference frame.

2. The system of claim 1 wherein the guidance dolly further comprises a guide channel for guiding the digital imaging device along a specified path while acquiring the plurality of two-dimensional image files of the target object.

3. The system of claim 1, wherein a reference object is integrated with the guidance dolly to provide for the reference frame.

4. A method of monitoring physical changes to a selected surface region of a tire tread, the method comprising the steps of:
   acquiring a first plurality of digital images of the selected surface region on a first tire using a guidance dolly and a single camera, the guidance dolly having a contact surface defining a trajectory path for the camera about the selected surface region on the first tire;
   converting the first plurality of two-dimensional image files into a first three-dimensional file representative of the selected surface region;
   acquiring a second plurality of digital images of the selected surface region on a second tire using the guidance dolly;
   converting the second plurality of two-dimensional image files into a second three-dimensional file representative of the selected surface region; and
   comparing a first image generated from the first three-dimensional file with a second image generated from the second three-dimensional file.

5. The method of claim 4 wherein the steps of acquiring the plurality of digital images comprises the step of moving a digital imaging device along a guide channel disposed in the guidance dolly.

6. The method of claim 4, wherein the first tire is a stock tire with the same make and model of the second tire.

7. The method of claim 6, wherein the first three-dimensional file is a three dimensional model of tread surface of the first tire.

8. The method of claim 7, wherein the second plurality of two-dimensional images are two-dimensional images of the second tire.

9. The method of claim 8, wherein the second plurality of two-dimensional images include reference frames, and wherein converting the second plurality of two-dimensional image files into a second three-dimensional file representative of the selected surface region further comprises the step of aligning the reference frames in the second plurality of two-dimensional images to construct the second three-dimensional model of the surface of the second tire.

10. The method of claim 9, further comprising the step of determining tread wear by comparing the first three-dimensional model and the second three-dimensional model.

\* \* \* \* \*